US012679534B2

(12) United States Patent
Nakai

(10) Patent No.: US 12,679,534 B2
(45) Date of Patent: Jul. 14, 2026

(54) AIRCRAFT AND ROTOR BLADE MODULE

(71) Applicant: teTra aviation corp., Minamisoma (JP)

(72) Inventor: Tasuku Nakai, Minamisoma (JP)

(73) Assignee: teTra aviation corp., Minamisoma (JP)

( * ) Notice: Subject to any disclaimer, the term of this patent is extended or adjusted under 35 U.S.C. 154(b) by 0 days.

(21) Appl. No.: 18/806,869

(22) Filed: Aug. 16, 2024

(65) Prior Publication Data

US 2025/0042543 A1     Feb. 6, 2025

Related U.S. Application Data

(63) Continuation of application No. PCT/JP2022/006426, filed on Feb. 17, 2022.

(51) Int. Cl.
| | |
|---|---|
| *B64C 29/00* | (2006.01) |
| *B64D 27/34* | (2024.01) |
| *B64D 27/357* | (2024.01) |

(52) U.S. Cl.
CPC ...... *B64C 29/0025* (2013.01); *B64C 29/0091* (2013.01); *B64D 27/34* (2024.01); *B64D 27/357* (2024.01)

(58) Field of Classification Search
CPC ..... B64C 29/00; B64C 29/0025; B64C 27/34; B64D 33/08
See application file for complete search history.

(56) References Cited

U.S. PATENT DOCUMENTS

| | | | | |
|---|---|---|---|---|
| 9,784,171 | B2 * | 10/2017 | Bleechmore | ........... B64D 33/08 |
| 11,745,865 | B2 * | 9/2023 | Tian | ........................ B64D 33/08 |
| | | | | 244/119 |

| | | | | |
|---|---|---|---|---|
| 2018/0105268 | A1 | 4/2018 | Tighe et al. | |
| 2021/0403154 | A1 * | 12/2021 | Tighe | ...................... B64C 27/26 |
| 2022/0194618 | A1 * | 6/2022 | Cho | ................... B64C 29/0016 |

FOREIGN PATENT DOCUMENTS

| | | | |
|---|---|---|---|
| DE | 10 2018 217 144 A1 | 4/2020 | |
| JP | 2016-175489 A | 10/2016 | |
| JP | 2020-55387 A | 4/2020 | |

OTHER PUBLICATIONS

International Search Report with Written Opinion of the International Searching Authority issued by the Japan Patent Office for corresponding International Patent Application No. PCT/JP2022/006426, mailed on Mar. 29, 2022, with an English translation.

* cited by examiner

*Primary Examiner* — Joshua D Huson
*Assistant Examiner* — Anna L. Gordon
(74) *Attorney, Agent, or Firm* — Myers Wolin, LLC

(57)     ABSTRACT

An aircraft that performs vertical take-off and landing includes: a fuselage; at least one pair of fixed wings; a rotor blade; a rotational drive unit that rotationally drives the rotor blade by electric power; and a support that has an inner space that accommodates at least a part of the rotational drive unit, and supports the rotor blade, wherein the support has a first opening forming portion that has a first opening communicating the inner space and the outside of the support at a position different from a position downstream of an airflow blown by rotation of the rotor blade, and a second opening forming portion that has a second opening communicating the inner space and the outside of the support at a position downstream of the airflow blown by rotation of the rotor blade.

20 Claims, 23 Drawing Sheets

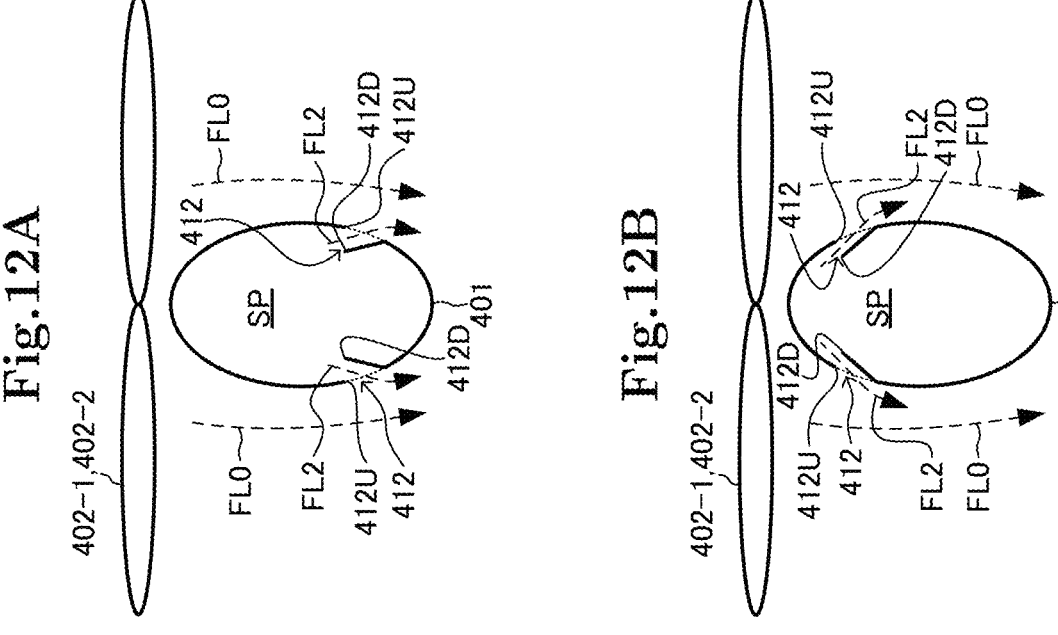

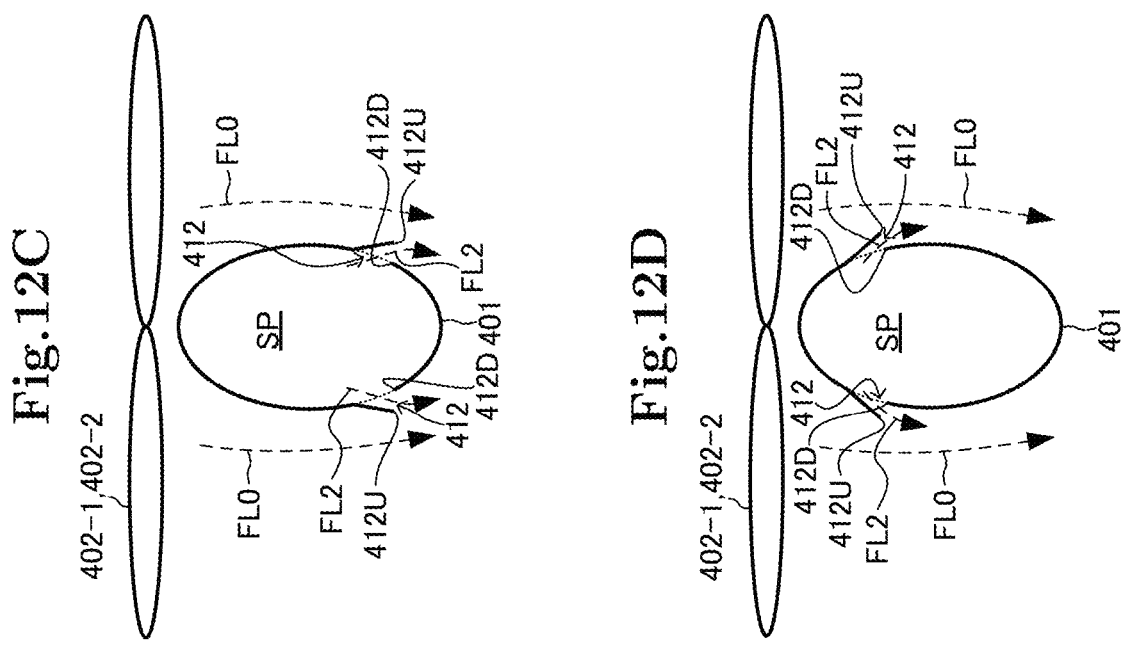

Fig.21
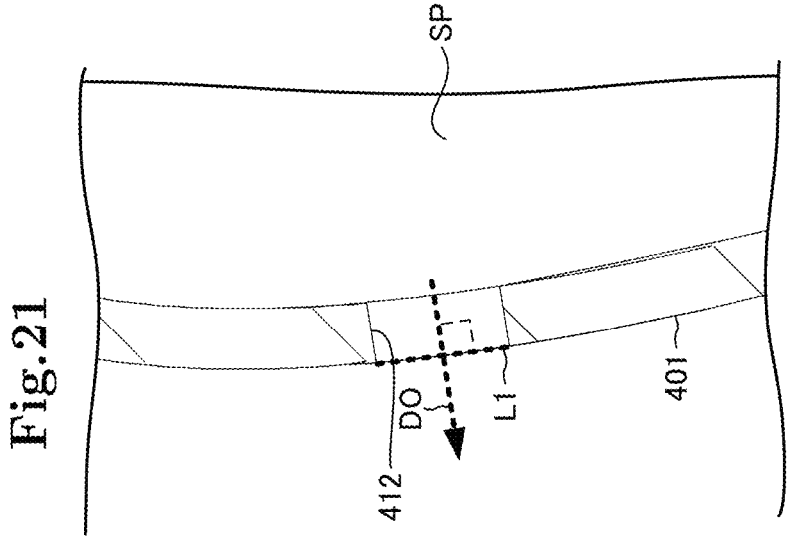
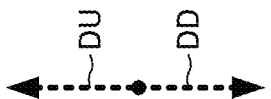

AIRCRAFT AND ROTOR BLADE MODULE

CROSS-REFERENCE TO RELATED APPLICATION

This application is a continuation application of International Application PCT/JP2022/006426 filed on Feb. 17, 2022, and designated the U.S., the entire contents of which are incorporated herein by reference.

FIELD

This disclosure relates to an aircraft and a rotor blade module.

BACKGROUND

Aircrafts performing vertical take-off and landing are known. For example, the aircraft described in US Patent Application Publication No. 2018/0105268 A1 includes a fuselage, a pair of fixed wings extending in a left-right direction from the fuselage, and multiple rotor blade modules fixed to the pair of fixed wings.

The rotor blade module includes a pair of rotor blades that generate thrust to propel the aircraft vertically upward by being rotationally driven, a rotational drive unit that rotationally drives the rotor blades by electric power, and a support that supports the pair of rotor blades. The support extends in a front-back direction of the aircraft, and has an inner space that accommodates the rotational drive unit.

The support has a first opening that communicates the inner space and the outside of the support at a position vertically below the rotor blade on the vertically upper outer surface. The support has a second opening that communicates the inner space and the outside of the support at an intermediate position of the pair of rotor blades on the vertically lower outer surface.

With this configuration, the air blown by rotation of the rotor blade flows directly into the inner space through the first opening, and flows out of the inner space through the second opening. Therefore, the rotational drive unit located in the inner space is cooled by the airflow blown by rotation of the rotor blades.

SUMMARY

However, the air blown by rotation of the rotor blade is prone to contain foreign objects such as dust, rain, or snow. Therefore, in the above aircraft, the foreign objects are more likely to flow into the inner space together with the air blown by rotation of the rotor blade. As a result, the rotational drive unit located in the inner space could be degraded by the foreign objects.

One of the purposes of this disclosure is to cool the rotational drive unit while suppressing the inflow of foreign objects.

In one aspect, an aircraft performs vertical take-off and landing.

The aircraft comprises a fuselage, at least one pair of fixed wings that extends in a left-right direction from the fuselage, a rotor blade that generates thrust to propel the aircraft vertically upward by being rotationally driven, a rotational drive unit that rotationally drives the rotor blade by electric power, and a support that extends in a front-back direction of the aircraft, has an inner space that accommodates at least a part of the rotational drive unit, and supports the rotor blade.

The support has a first opening forming portion that has a first opening communicating the inner space and the outside of the support at a position different from a position downstream of an airflow blown by rotation of the rotor blade, and a second opening forming portion that has a second opening communicating the inner space and the outside of the support at a position downstream of the airflow blown by rotation of the rotor blade.

The second opening forming portion has a shape in which air in the inner space flows out to the outside of the support due to decrease in pressure in the vicinity of the second opening by the airflow blown by rotation of the rotor blade.

In another aspect, a rotor blade module is fixed to a fixed wing extending in a left-right direction from a fuselage of an aircraft.

The rotor blade module comprises a rotor blade that generates thrust to propel the aircraft vertically upward by being rotationally driven, a rotational drive unit that rotationally drives the rotor blade by electric power, and a support that extends in a front-back direction of the aircraft, has an inner space that accommodates at least a part of the rotational drive unit, and supports the rotor blade.

The support has a first opening forming portion that has a first opening communicating the inner space and the outside of the support at a position different from a position downstream of an airflow blown by rotation of the rotor blade, and a second opening forming portion that has a second opening communicating the inner space and the outside of the support at a position downstream of the airflow blown by rotation of the rotor blade.

The second opening forming portion has a shape in which air in the inner space flows out to the outside of the support due to decrease in pressure in the vicinity of the second opening by the airflow blown by rotation of the rotor blade.

The rotational drive unit can be cooled while suppressing the inflow of foreign objects.

BRIEF DESCRIPTION OF DRAWINGS

FIGS. 12A to 12D are schematic explanatory diagrams illustrating the second opening forming portion of the first embodiment and modified examples.

FIG. 21 is a sectional view of an enlarged vicinity of the second opening forming portion of FIG. 20.

DETAILED DESCRIPTION

Figure 1:
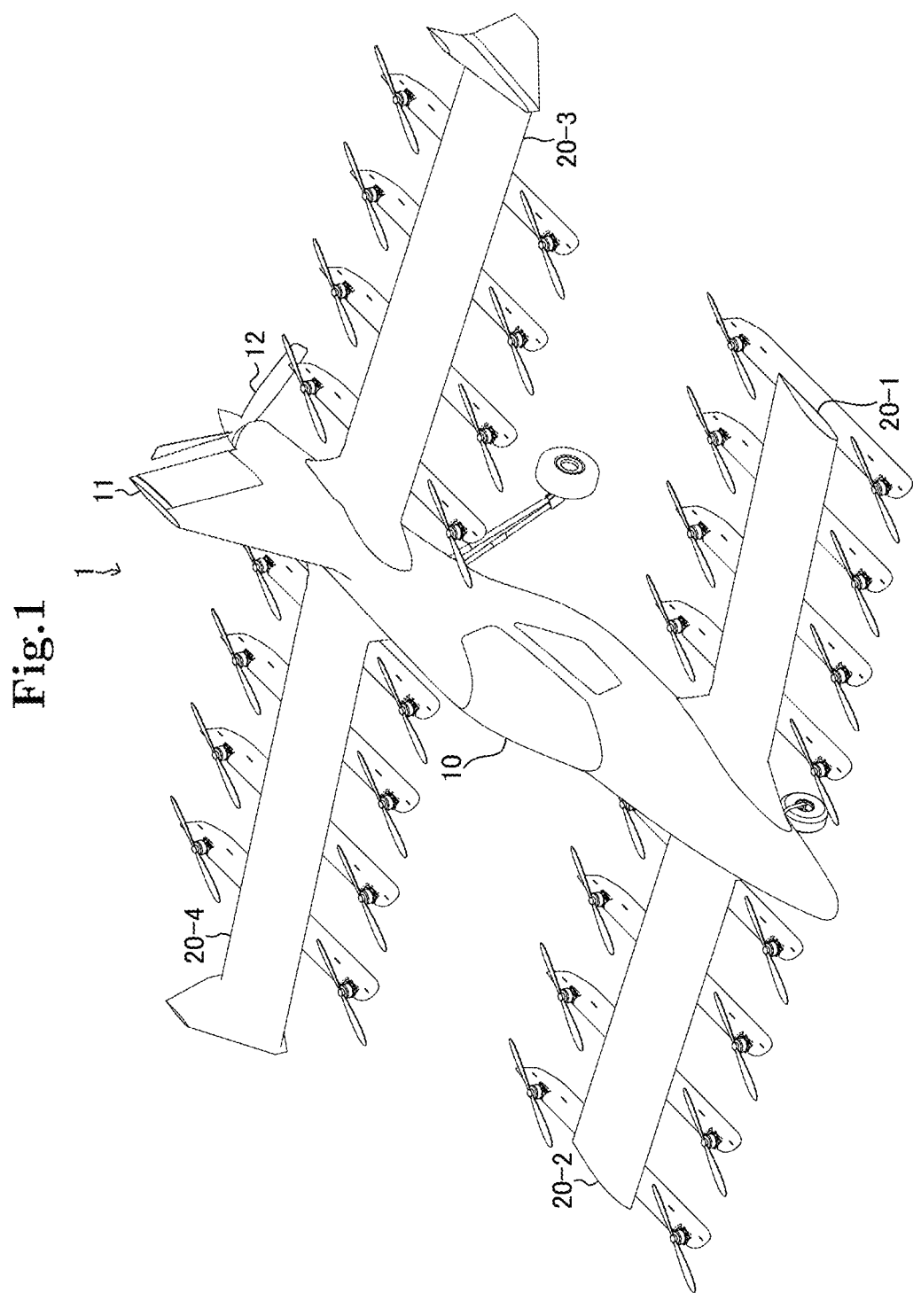
FIG. 1 is a perspective view illustrating a configuration of an aircraft of a first embodiment.

The following describes various embodiments related to an aircraft and a rotor blade module of this disclosure with reference to FIGS. 1 to 22.

First Embodiment (Overview)

An aircraft of a first embodiment performs vertical take-off and landing.

The aircraft comprises a fuselage, at least one pair of fixed wings that extends in a left-right direction from the fuselage, a rotor blade that generates thrust to propel the aircraft vertically upward by being rotationally driven, a rotational drive unit that rotationally drives the rotor blade by electric power, and a support that extends in a front-back direction of the aircraft, has an inner space that accommodates at least a part of the rotational drive unit, and supports the rotor blade.

The support has a first opening forming portion that has a first opening communicating the inner space and the outside of the support at a position different from a position downstream of an airflow blown by rotation of the rotor blade, and a second opening forming portion that has a second opening communicating the inner space and the outside of the support at a position downstream of the airflow blown by rotation of the rotor blade.

The second opening forming portion has a shape in which air in the inner space flows out to the outside of the support due to decrease in pressure in the vicinity of the second opening by the airflow blown by rotation of the rotor blade.

According to this, when air is blown by rotation of the rotor blade, the blown airflow causes air in the inner space to flow out of the support through the second opening, which is located at a position downstream of the airflow. This causes air to flow into the inner space through the first opening, which is located at a position different from a position downstream of the airflow. As a result, the rotational drive unit, which is located in the inner space, is cooled by the airflow in the inner space.

According to the above aircraft, in the downstream of the airflow blown by rotation of the rotor blade, air does not flow into the inner space. Thus, even if the air blown by rotation of the rotor blade contains foreign objects, the foreign objects can be prevented from flowing into the inner space. Accordingly, the above aircraft can cool the rotational drive unit while suppressing the inflow of foreign objects.

Next, the aircraft and the rotor blade module of the first embodiment will be described in more detail.

(Configuration)

As illustrated in FIGS. 1 to 5, the aircraft 1 performs vertical take-off and landing. In this example, the aircraft 1 is an eVTOL (electric Vertical Take-Off and Landing) that flies by electric power. The aircraft 1 switches an operating state between a state of performing vertical flight (in other words, a take-off and landing state) in which the aircraft 1 flies in the vertical direction (in other words, ascends or descends in the vertical direction), and a state of performing horizontal flight (in other words, a cruising state) in which the aircraft 1 flies in the horizontal direction (in other words, cruises).

In this example, each direction described below (e.g., an up-down direction, a front-back direction, or a left-right direction) is a direction in the take-off and landing state. Alternatively, each direction may be a direction in the cruising state. An upward direction and a downward direction are the vertically upward direction and the vertically downward direction, respectively.

The aircraft 1 includes a fuselage 10, a pair of front fixed wings 20-1, 20-2, and a pair of rear fixed wings 20-3, 20-4. The number of pairs of fixed wings included in the aircraft 1 may be one or more than three. In this example, each of the pair of front fixed wings 20-1, 20-2 and the pair of rear fixed wings 20-3, 20-4 is also simply referred to as the fixed wing 20-_j_ (j represents an integer from 1 to 4).

The fuselage 10 extends in a front-back direction of the aircraft 1 at the central portion in a left-right direction of the aircraft 1. In this example, the fuselage 10 has a shape in which two rod-shaped or pillar-shaped members, each having a different position in an up-down direction of the aircraft 1 and in the front-back direction of the aircraft 1, are connected to each other at the central portion in the front-back direction of the aircraft 1.

In this example, in the fuselage 10, the end face of the end portion, which is of the aircraft 1 in the forward direction, in the vertically downward direction is located vertically below the end face of the end portion, which is of the aircraft 1 in the backward direction, in the vertically downward direction. In this example, in the fuselage 10, the end face of the end portion, which is of the aircraft 1 in the forward direction, in the vertically upward direction is located vertically below the end face of the end portion, which is of the aircraft 1 in the backward direction, in the vertically upward direction.

The fuselage 10 may be a rod-shaped or pillar-shaped member extending in the front-back direction of the aircraft 1. For example, the fuselage 10 may have a shape becoming thinner towards the tip (in other words, a tapered shape) at each end portion in the front-back direction of the aircraft 1.

For example, the length of the fuselage 10 in the front-back direction may be between 1 m and 15 m.

The pair of front fixed wings 20-1, 20-2 are plate-shaped members extending from the fuselage 10 to the left direction of the aircraft 1 and to the right direction of the aircraft 1, respectively. Each of the pair of front fixed wings 20-1, 20-2 has an airfoil shape in a cross-section cut by a plane orthogonal to the left-right direction of the aircraft 1.

The pair of front fixed wings 20-1, 20-2 are plane symmetrical to each other with respect to a plane that is orthogonal to the left-right direction of the aircraft 1 and passes through the center of the fuselage 10 in the left-right direction. For example, the length of each of the pair of front fixed wings 20-1, 20-2 in the left-right direction may be 0.5 m to 10 m.

The pair of front fixed wings 20-1, 20-2 are located in front of the center of the fuselage 10 in the front-back direction of the aircraft 1. In this example, the pair of front fixed wings 20-1, 20-2 are located at the end portion of the fuselage 10 in the forward direction. For example, the pair of front fixed wings 20-1, 20-2 have a position in the front-back direction of the aircraft 1 such that a ratio of the distance from the end of the fuselage 10 in the forward direction to the end of the pair of front fixed wings 20-1, 20-2 in the backward direction to the length of the fuselage 10 in the front-back direction of the aircraft 1 is a value between 0.01 and 0.4 (in this example, 0.1 and 0.3).

Figure 5:
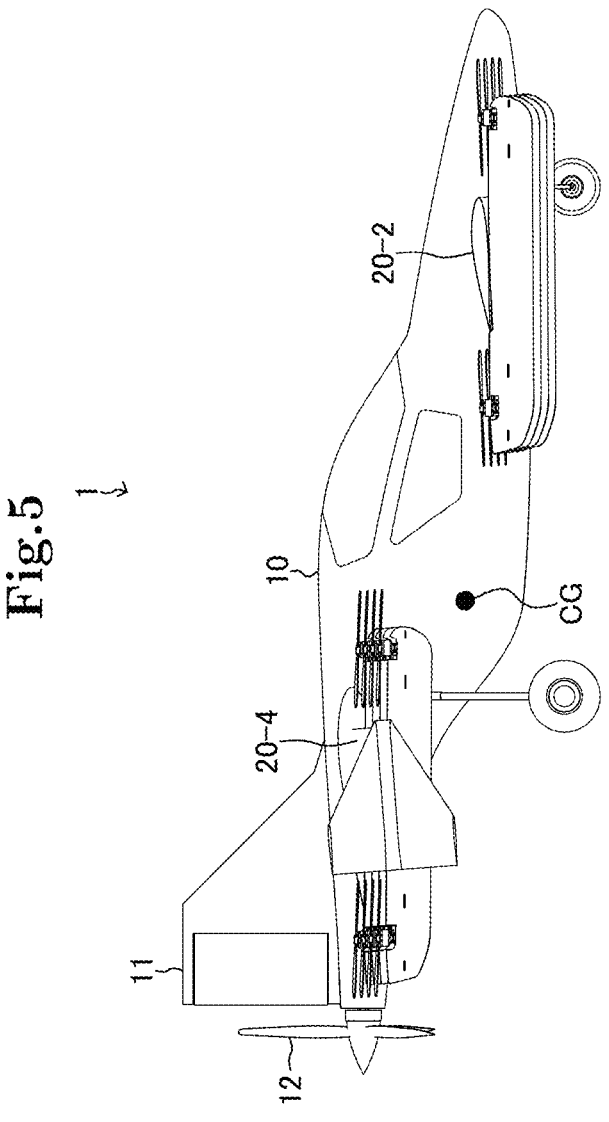
FIG. 5 is a left side view illustrating the configuration of the aircraft of the first embodiment.

In this example, as illustrated in FIG. 5, the pair of front fixed wings 20-1, 20-2 have a position in front of the center of gravity CG of the aircraft 1.

The pair of front fixed wings 20-1, 20-2 are located below the center of the fuselage 10 in the up-down direction of the aircraft 1. In this example, the pair of front fixed wings 20-1, 20-2 are located at the end portion of the fuselage 10 in the downward direction. For example, the pair of front fixed wings 20-1, 20-2 have a position in the up-down direction of the aircraft 1 such that a ratio of the distance from the end of the fuselage in the downward direction to the end of the pair of front fixed wings 20-1, 20-2 in the upward direction to the height (in this example, the maximum height of the fuselage 10 in the up-down direction of the aircraft 1 excluding the tail wing 11 described later) of the fuselage 10 in the up-down direction of the aircraft 1 is a value between 0.01 and 0.4 (in this example, 0.05 and 0.2).

In this example, as illustrated in FIG. 5, the pair of front fixed wings 20-1, 20-2 are located vertically below the center of gravity CG of the aircraft 1.

The pair of rear fixed wings 20-3, 20-4 are plate-shaped members extending from the fuselage 10 to the left direction of the aircraft 1 and to the right direction of the aircraft 1, respectively. Each of the pair of rear fixed wings 20-3, 20-4 has an airfoil shape in a cross-section cut by a plane orthogonal to the left-right direction of the aircraft 1.

The pair of rear fixed wings 20-3, 20-4 are plane symmetrical to each other with respect to a plane that is orthogonal to the left-right direction of the aircraft 1 and passes through the center of the fuselage 10 in the left-right direction. The length of each of the pair of rear fixed wings 20-3, 20-4 in the left-right direction is approximately equal to the length of each of the pair of front fixed wings 20-1, 20-2 in the left-right direction. In this example, the length of each of the pair of rear fixed wings 20-3, 20-4 in the left-right direction is slightly longer than the length of each of the pair of front fixed wings 20-1, 20-2 in the left-right direction. For example, the length of each of the pair of rear fixed wings 20-3, 20-4 in the left-right direction may be 0.5 m to 10 m.

The pair of rear fixed wings 20-3, 20-4 are located behind the center of the fuselage 10 in the front-back direction of the aircraft 1. In this example, the pair of rear fixed wings 20-3, 20-4 are located at the end portion of the fuselage 10 in the backward direction. For example, the pair of rear fixed wings 20-3, 20-4 have a position in the front-back direction of the aircraft 1 such that a ratio of the distance from the end of the fuselage 10 in the backward direction to the end of the pair of rear fixed wings 20-3, 20-4 in the forward direction to the length of the fuselage 10 in the front-back direction of the aircraft 1 is a value between 0.01 and 0.4 (in this example, 0.1 and 0.3).

In this example, as illustrated in FIG. 5, the pair of rear fixed wings 20-3, 20-4 have a position behind the center of gravity CG of the aircraft 1.

The pair of rear fixed wings 20-3, 20-4 are located above the center of the fuselage 10 in the up-down direction of the aircraft 1. In this example, the pair of rear fixed wings 20-3, 20-4 are located at the end portion of the fuselage 10 in the upward direction. For example, the pair of rear fixed wings 20-3, 20-4 have a position in the up-down direction of the aircraft 1 such that a ratio of the distance from the end of the fuselage 10 in the upward direction to the end of the pair of rear fixed wings 20-3, 20-4 in the downward direction to the height of the fuselage 10 in the up-down direction of the aircraft 1 is a value between 0.01 and 0.4 (in this example, 0.05 and 0.2).

In this example, as illustrated in FIG. 5, the pair of rear fixed wings 20-3, 20-4 are located vertically above the center of gravity CG of the aircraft 1.

Thus, in this example, the aircraft 1 includes two pairs of fixed wings 20-1 to 20-4 whose positions in the front-back direction of the aircraft 1 are different from each other and whose positions in the up-down direction of the aircraft 1 are different from each other. In other words, in this example, the aircraft 1 includes the pair of front fixed wings 20-1, 20-2, and the pair of rear fixed wings 20-3, 20-4, which are located behind the pair of front fixed wings 20-1, 20-2 and have a different position in the vertical direction from the pair of front fixed wings 20-1, 20-2.

In this example, the pair of front fixed wings 20-1, 20-2 corresponds to a pair of first fixed wings. In this example, the pair of rear fixed wings 20-3, 20-4 corresponds to a pair of second fixed wings.

As described above, in this example, the pair of rear fixed wings 20-3, 20-4 are located vertically above the pair of front fixed wings 20-1, 20-2 in the vertical direction. Alternatively, the pair of rear fixed wings 20-3, 20-4 may be located vertically below the pair of front fixed wings 20-1, 20-2 in the vertical direction. In this case, the pair of front fixed wings 20-1, 20-2 may have a position vertically above the center of gravity CG of the aircraft 1, and the pair of rear fixed wings 20-3, 20-4 may have a position vertically below the center of gravity CG of the aircraft 1.

The aircraft 1 includes multiple (16 in this example) rotor blade modules 40-1 to 40-16, which are fixed to the pair of front fixed wings 20-1, 20-2 and the pair of rear fixed wings 20-3, 20-4. The number of rotor blade modules included in the aircraft 1 may be 2 to 15 or may be 17 or more. For example, the number of rotor blade modules included in the aircraft 1 is 8, 12, 16, 20, or 24.

It is preferable that the number of rotor blade modules fixed to each fixed wing 20-j is two or more.

In this example, the multiple rotor blade modules 40-1 to 40-16 are removably fixed to the pair of front fixed wings 20-1, 20-2 and the pair of rear fixed wings 20-3, 20-4.

Alternatively, the multiple rotor blade modules 40-1 to 40-16 may be fixed in an unremovable manner to (for example, formed integrally with) the pair of front fixed wings 20-1, 20-2 and the pair of rear fixed wings 20-3, 20-4.

The four rotor blade modules 40-1 to 40-4 are fixed to the front fixed wing 20-1 located to the left of the fuselage 10 among the pair of front fixed wings 20-1, 20-2. The four rotor blade modules 40-5 to 40-8 are fixed to the front fixed wing 20-2 located to the right of the fuselage 10 among the pair of front fixed wings 20-1, 20-2. The four rotor blade modules 40-9 to 40-12 are fixed to the rear fixed wing 20-3 located to the left of the fuselage 10 among the pair of rear fixed wings 20-3, 20-4. The four rotor blade modules 40-13 to 40-16 are fixed to the rear fixed wing 20-4 located to the right of the fuselage 10 among the pair of rear fixed wings 20-3, 20-4.

The eight rotor blade modules 40-1 to 40-4, 40-9 to 40-12 located to the left of the fuselage 10, and the eight rotor blade modules 40-5 to 40-8, 40-13 to 40-16 located to the right of the fuselage 10 are plane symmetrical to each other with respect to a plane that is orthogonal to the left-right direction of the aircraft 1 and passes through the center in the left-right direction of the fuselage 10.

The rotor blade module 40-i (where i represents an integer from 1 to 16) fixed to the fixed wing 20-j is located in an area other than the tip portion of the fixed wing 20-j in the left-right direction of the aircraft 1.

In this example, the rotor blade module 40-i fixed to the fixed wing 20-j has a position in the left-right direction of the aircraft 1 such that a ratio of the distance from the tip of the fixed wing 20-j to the rotor blade module 40-i to the length of the fixed wing 20-j in the left-right direction of the aircraft 1 is greater than 0 and less than 1 (in this example, greater than 0 and up to 0.95).

At least one of the rotor blade modules 40-i fixed to the fixed wing 20-j may be located at the tip portion of the fixed wing 20-j in the left-right direction of the aircraft 1.

In this example, the four rotor blade modules 40-k to 40-l (where k represents an integer of 1, 5, 9, or 13, and l represents an integer of k+3) fixed to the fixed wing 20-j are equally spaced in the left-right direction of the aircraft 1. The four rotor blade modules 40-k to 40-l fixed to the fixed wing 20-j may be unequally spaced in the left-right direction of the aircraft 1.

For example, the four rotor blade modules 40-k to 40-l fixed to the fixed wing 20-j may have a position in the left-right direction of the aircraft 1 such that a ratio of the distance between the two adjacent rotor blade modules among the four rotor blade modules 40-k to 40-l to the length of the fixed wing 20-j in the left-right direction of the aircraft 1 is a value of 0.1 to 0.4 (in this example, 0.2 to 0.3).

In this example, in the left-right direction of the aircraft 1, the distance between two adjacent rotor blade modules among the four rotor blade modules 40-1 to 40-4 fixed to the front fixed wing 20-1 is equal to the distance between two adjacent rotor blade modules among the four rotor blade modules 40-9 to 40-12 fixed to the rear fixed wing 20-3. The distance between them may be different from each other.

In this example, the positions of the four rotor blade modules 40-1 to 40-4 fixed to the front fixed wing 20-1, and the positions of the four rotor blade modules 40-9 to 40-12 fixed to the rear fixed wing 20-3 in the left-right direction of the aircraft 1 are approximately the same.

In this example, in the left-right direction of the aircraft 1, the positions of the four rotor blade modules 40-1 to 40-4 fixed to the front fixed wing 20-1 coincide with the positions of the four rotor blade modules 40-9 to 40-12 fixed to the rear fixed wing 20-3. The positions of them may be different from each other.

In this example, in the up-down direction of the aircraft 1, the positions of the four rotor blade modules 40-1 to 40-4 fixed to the front fixed wing 20-1, and the positions of the four rotor blade modules 40-9 to 40-12 fixed to the rear fixed wing 20-3 are different from each other. In this example, the four rotor blade modules 40-1 to 40-4 fixed to the front fixed wing 20-1 have a position lower for the aircraft 1 than the four rotor blade modules 40-9 to 40-12 fixed to the rear fixed wing 20-3. Alternatively, the four rotor blade modules 40-1 to 40-4 fixed to the front fixed wing 20-1 may have a position upper for the aircraft 1 than the four rotor blade modules 40-9 to 40-12 fixed to the rear fixed wing 20-3.

In this example, the four rotor blade modules 40-1 to 40-4 fixed to the front fixed wing 20-1 and the four rotor blade modules 40-9 to 40-12 fixed to the rear fixed wing 20-3 are separated from each other in the front-back direction of the aircraft 1 when the aircraft 1 is viewed in the vertical direction.

Figure 6:
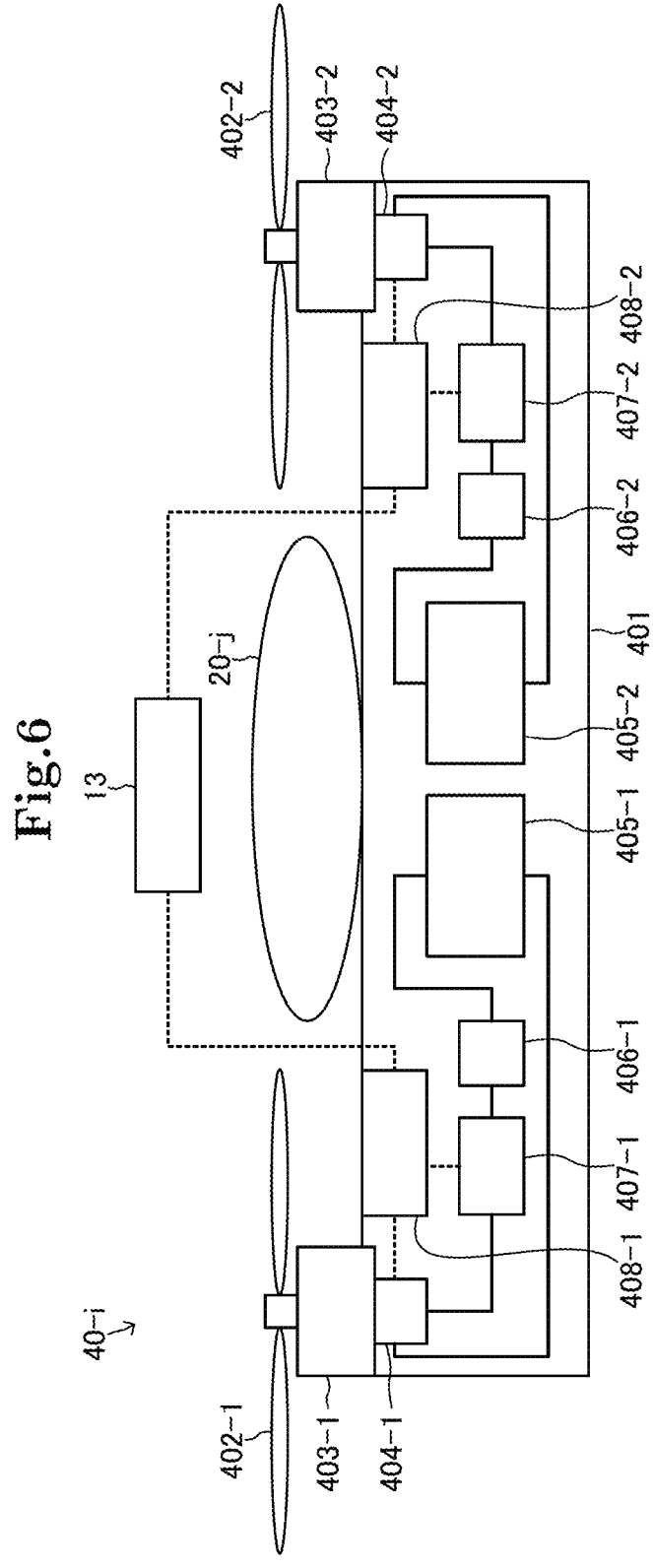
FIG. 6 is a block diagram illustrating a schematic configuration of a rotor blade module of the first embodiment.

As illustrated in FIG. 6, the rotor blade module 40-i fixed to the fixed wing 20-j includes a support 401, a pair of first rotor blades 402-1, 402-2, a pair of electric motors 403-1, 403-2, a pair of speed controllers 404-1, 404-2, a pair of first storage batteries 405-1, 405-2, a pair of circuit protectors 406-1, 406-2, a pair of circuit switches 407-1, 407-2, and a pair of controllers 408-1, 408-2.

The support 401 is a rod-shaped or pillar-shaped member extending in the front-back direction of the aircraft 1 over the front and rear of the fixed wing 20-j in the front-back direction of the aircraft 1 (in other words, when the aircraft 1 is viewed in the vertical direction). The central portion of the support 401 in the front-back direction of the aircraft 1 is removably fixed to the fixed wing 20-j. The support 401 has an inner space SP, which will be described later.

In this example, the support 401 is located vertically below the fixed wing 20-j. Alternatively, the support 401 may be located vertically above the fixed wing 20-j.

Each of the pair of first rotor blades 402-1, 402-2 is rotatably supported by the support 401 vertically above the support 401 such that the central axis of rotation extends in a direction having a main component of the up-down direction of the aircraft 1. The pair of first rotor blades 402-1, 402-2 generate thrust to propel the aircraft 1 upward by being rotationally driven by the pair of electric motors 403-1, 403-2, respectively.

In this example, the pair of first rotor blades 402-1, 402-2 corresponds to a pair of rotor blade for vertical direction.

The pair of first rotor blades 402-1, 402-2 are located in front of the fixed wing 20-j, and behind the fixed wing 20-j, respectively, in the front-back direction of the aircraft 1. In this example, the pair of first rotor blades 402-1, 402-2 are located at both end portions of the support 401 in the front-back direction of the aircraft 1, respectively.

The pair of first rotor blades 402-1, 402-2 may have a position such that a ratio of the distance between the pair of first rotor blades 402-1, 402-2 in the front-back direction of the aircraft 1 to the length of the fixed wing 20-j in the front-back direction of the aircraft 1 is a value between 1.2 and 4.5 (in this example, 2 and 3).

Each of the pair of first rotor blades 402-1, 402-2 may have a position such that a ratio of the shortest distance between a trajectory of the tip of the first rotor blade 402-1, 402-2 and the fixed wing 20-j to the length of the fixed wing 20-j in the front-back direction of the aircraft 1 is greater than 0 and less than or equal to 0.2 (in this example, a value between 0.02 and 0.08).

Figure 3:
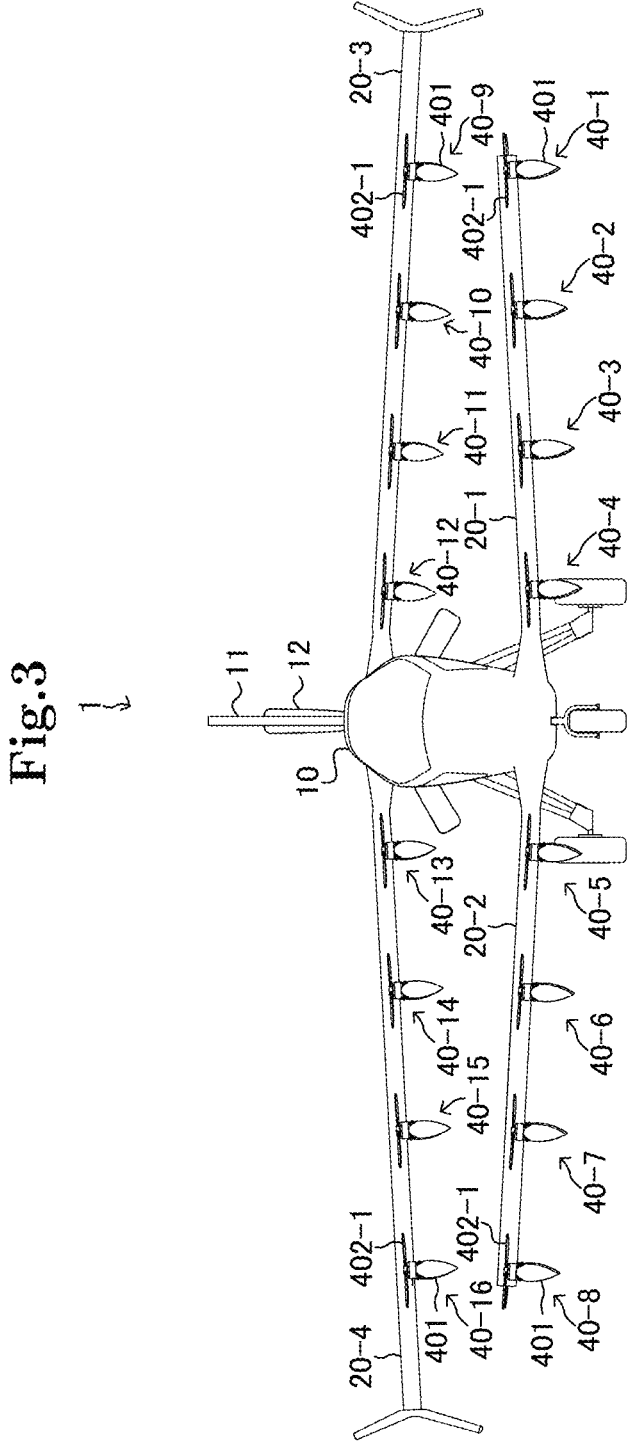
FIG. 3 is a front view illustrating the configuration of the aircraft of the first embodiment.
Figure 4:
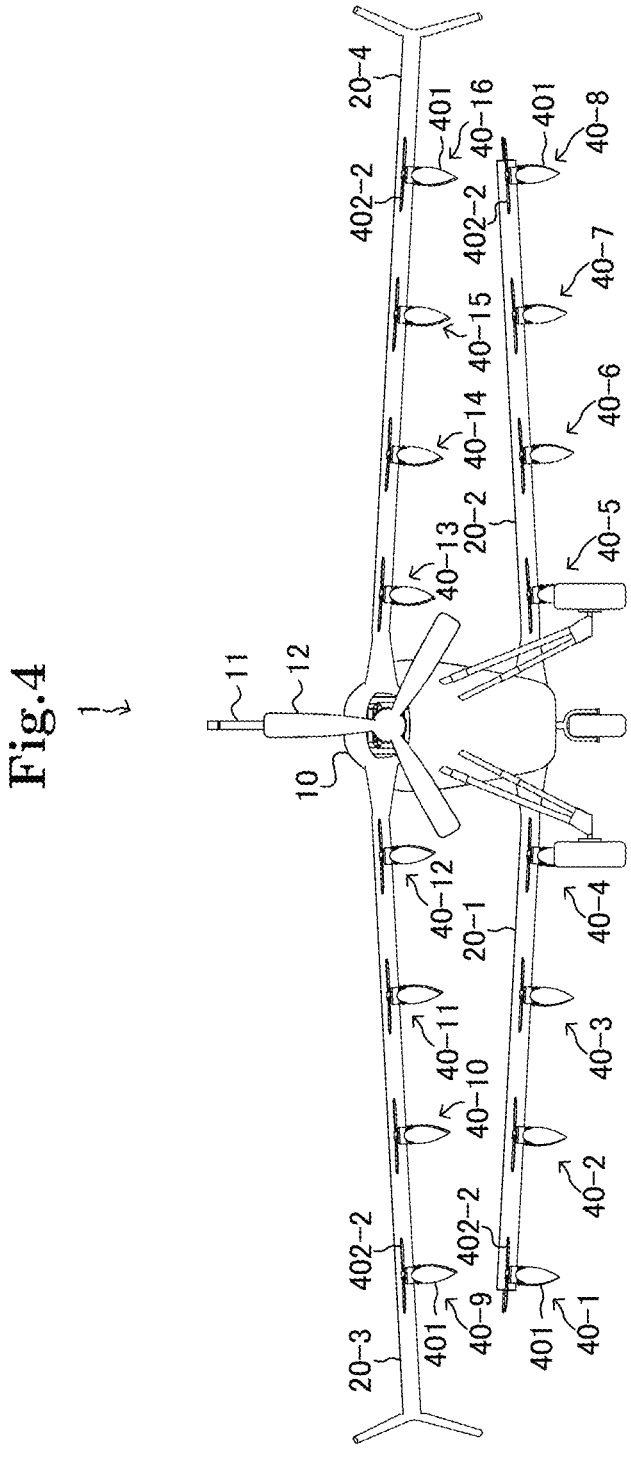
FIG. 4 is a rear view illustrating the configuration of the aircraft of the first embodiment.

In this example, the position of the pair of first rotor blades 402-1, 402-2 in the vertical direction is between the most vertically upward position and the most vertically downward position of a cross-section of the fixed wing 20-j by a plane passing through the central axis of rotation of the pair of first rotor blades 402-1, 402-2. In other words, as illustrated in FIGS. 3 and 4, when the aircraft 1 is viewed in the front-back direction of the aircraft 1, the pair of first rotor blades 402-1, 402-2 have positions overlapping with the fixed wing 20-*j*.

In this example, the pair of first rotor blades 402-1, 402-2 have directions of rotation different from each other.

In this example, the two first rotor blades 402-1 adjacent in the left-right direction of the aircraft 1 have directions of rotation different from each other, and the two first rotor blades 402-2 adjacent in the left-right direction of the aircraft 1 have directions of rotation different from each other. In this example, the two first rotor blades 402-1, 402-2 adjacent in the up-down direction of the aircraft 1 have directions of rotation different from each other.

In this example, the first rotor blades 402-1, 402-2 may also be referred to as rotors.

The following describes the configuration (in this example, the electric motor 403-1, the speed controller 404-1, the first storage battery 405-1, the circuit protector 406-1, the circuit switch 407-1, and the controller 408-1) for rotationally driving the first rotor blade 402-1. The configuration (in this example, the electric motor 403-2, the speed controller 404-2, the first storage battery 405-2, the circuit protector 406-2, the circuit switch 407-2, and the controller 408-2) for rotationally driving the first rotor blade 402-2 is described similarly to the configuration for rotationally driving the first rotor blade 402-1, so that the description is omitted.

Figure 7:
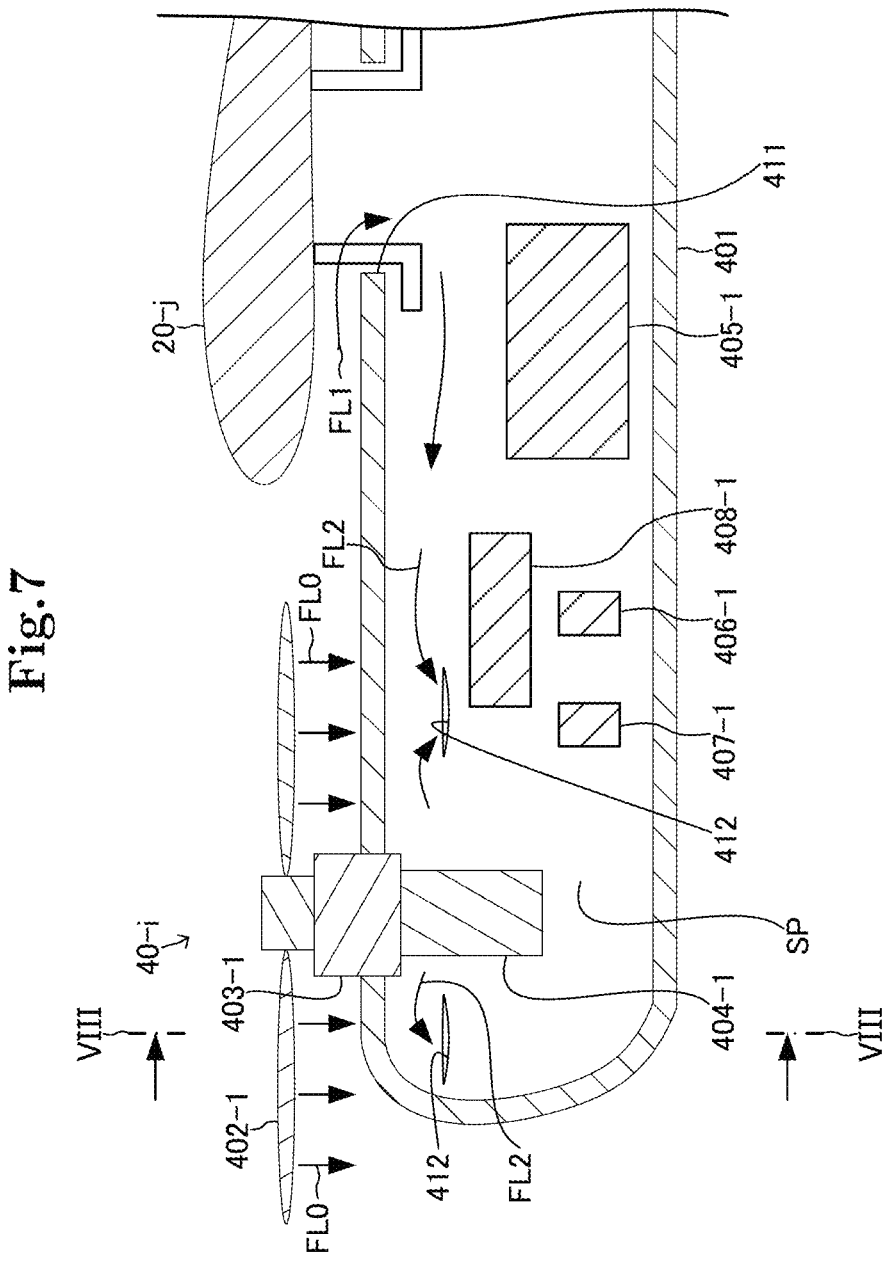
FIG. 7 is a sectional view of the rotor blade module of the first embodiment in a vertical plane orthogonal to a left-right direction of the aircraft.

In this example, as illustrated in FIG. 7 representing a cross-section of the rotor blade module 40-*i* by a vertical plane orthogonal to the left-right direction of the aircraft 1, the speed controller 404-1, the first storage battery 405-1, the circuit protector 406-1, the circuit switch 407-1, and the controller 408-1 are accommodated in the inner space SP of the support 401. In this example, a part of the electric motor 403-1 is also accommodated in the inner space SP of the support 401. In FIG. 7, cables through which the current flows, and signal lines through which the control signal is transmitted are not illustrated. Alternatively, the entirety of the electric motor 403-1 may be accommodated in the inner space SP of the support 401. Alternatively, the entirety of the electric motor 403-1 may be located outside the support 401.

The electric motor 403-1 rotationally drives the first rotor blade 402-1 with electric power supplied by the speed controller 404-1.

The speed controller 404-1 controls the electric power supplied to the electric motor 403-1 to control the rotation speed (in other words, the number of rotations) of the first rotor blade 402-1, which is rotationally driven by the electric motor 403-1, in accordance with the control signal transmitted from the controller 408-1.

In this example, the speed controller 404-1 may also be referred to as an Electric Speed Controller (ESC).

The first storage battery 405-1 charges and discharges electric power. In this example, the first storage battery 405-1 includes single batteries (in other words, cells) connected in series. In this example, the first storage battery 405-1 has a voltage of 24 V to 120 V.

The first storage battery 405-1 supplies electric power to the electric motor 403-1 through the circuit protector 406-1, the circuit switch 407-1, and the speed controller 404-1.

The first storage battery 405-1 is fixed to the support 401. In this example, the first storage battery 405-1 is located between the pair of first rotor blades 402-1, 402-2 in the front-back direction of the aircraft 1. For example, the first storage battery 405-1 is located at the center of the support 401 in the front-back direction of the aircraft 1. In this example, the first storage battery 405-1 is located below the fixed wing 20-*j*. Alternatively, the first storage battery 405-1 may be located between the first rotor blade 402-1 and the fixed wing 20-*j* in the front-back direction of the aircraft 1.

The circuit protector 406-1 interrupts current between the speed controller 404-1 and the first storage battery 405-1 when the current supplied from the first storage battery 405-1 to the speed controller 404-1 exceeds a predetermined threshold. In this example, the circuit protector 406-1 may also be referred to as an electric power fuse.

Between the speed controller 404-1 and the first storage battery 405-1 (in this example, between the circuit protector 406-1 and the speed controller 404-1), the circuit switch 407-1 switches its operating state between an on state that allows current to be supplied from the first storage battery 405-1 to the speed controller 404-1, and an off state that prohibits current to be supplied from the first storage battery 405-1 to the speed controller 404-1 (in other words, interrupts current supplied from the first storage battery 405-1 to the speed controller 404-1), in accordance with the control signal transmitted from the controller 408-1. In this example, the circuit switch 407-1 is a contactor.

The controller 408-1 controls each of the speed controller 404-1, and the circuit switch 407-1 in accordance with the control signal transmitted from the control device 13 described below.

In this example, the electric motor 403-1, the speed controller 404-1, the first storage battery 405-1, the circuit protector 406-1, the circuit switch 407-1, and the controller 408-1 correspond to the rotational drive unit which rotationally drives the first rotor blade 402-1 by electric power.

With this configuration, the aircraft 1 performs vertical take-off and landing by thrust, which propels the aircraft 1 in the upward direction, generated by each of the pair of first rotor blades 402-1, 402-2 included in each of the multiple rotor blade modules 40-1 to 40-16.

Figure 8:
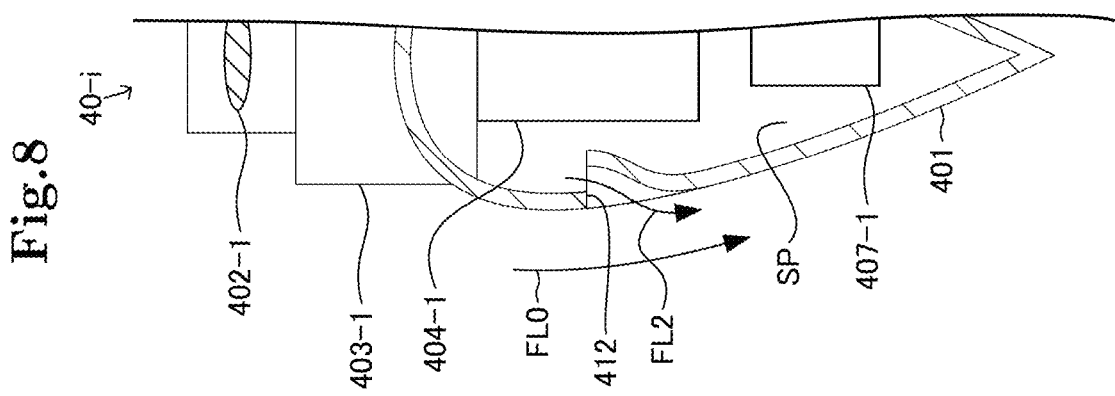
FIG. 8 is a sectional view of the rotor blade module in a vertical plane represented by the VIII-VIII line in FIG. 7.

The following describes the support 401 with reference to FIGS. 7 and 8. FIG. 8 illustrates a cross-section of the rotor blade module 40-*i* by the vertical plane represented by the VIII-VIII line in FIG. 7.

The support 401 includes a first opening forming portion 411, and multiple second opening forming portions 412. In this example, the number of second opening forming portions 412 included in the support 401 is eight. Alternatively, the number of second opening forming portions 412 included in the support 401 may be one to seven, or nine or more.

The first opening forming portion 411 has a first opening that communicates the inner space SP of the support 401 and the outside of the support 401 at a position different from a position downstream of the airflow FL0 blown by rotation of the first rotor blade 402-1, 402-2.

In this example, the first opening forming portion 411 is located vertically below the fixed wing 20-*j*. In this example, the first opening forming portion 411 faces the end face of the fixed wing 20-*j* in the vertically downward direction. Alternatively, the first opening forming portion 411 may be located at the end face (in other words, side face) of the support 401 in the left-right direction of the aircraft 1 vertically below the fixed wing 20-*j*.

Alternatively, the first opening forming portion 411 may be located at the end portion of the support 401 in the vertical downward direction of the aircraft 1 vertically below the fixed wing 20-*j*. Alternatively, the first opening forming portion 411 may be located at a portion, which is the end portion of the support 401 in the vertically downward direction of the aircraft 1, of the support 401 other than the portion vertically below the fixed wing 20-*j*.

As illustrated in FIG. 8, each of the multiple second opening forming portions 412 has a second opening that communicates the inner space SP of the support 401 and the outside of the support 401 at a position downstream of the airflow FL0 blown by rotation of the first rotor blade 402-1, 402-2.

Figure 9:
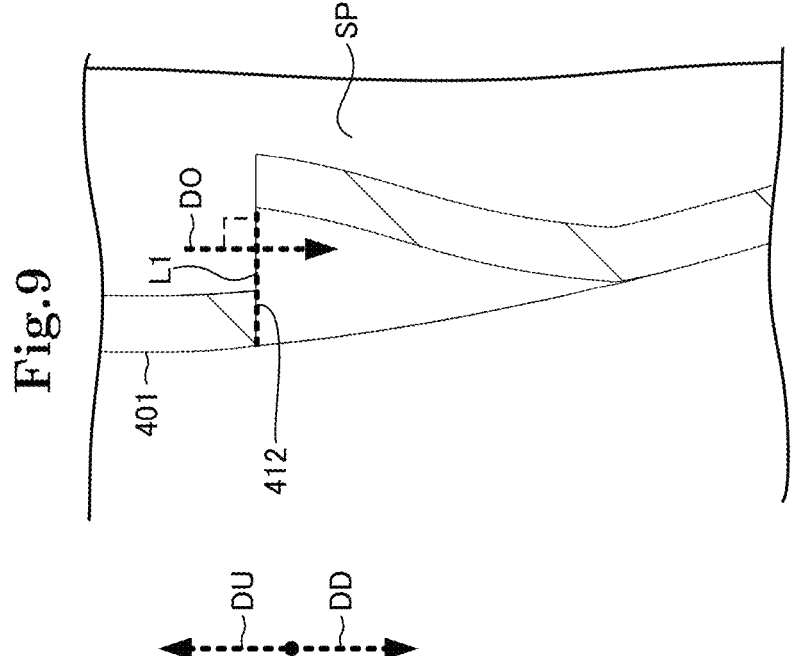
FIG. 9 is a sectional view of an enlarged vicinity of a second opening forming portion in FIG. 8.

As illustrated in FIG. 9, which is an enlarged view of the second opening forming portion 412 in FIG. 8, the second opening forming portion 412 is configured that an opening direction DO does not have a component of the vertically upward direction DU (in other words, is orthogonal to the vertical direction, or has a component of the vertically downward direction DD). The opening direction DO is a direction orthogonal to a straight line L1 connecting two ends forming the second opening of the outer surface of the support 401 in a cross-section of the support 401 by a vertical plane. Furthermore, the opening direction DO is from the inner space SP of the support 401 to the outside of the support 401.

With this configuration, pressure in the vicinity of the second opening is reduced by the airflow FL0 blown by rotation of the first rotor blade 402-1, 402-2. This causes air inside the inner space SP of the support 401 to flow out to the outside of the support 401, as represented by the arrow FL2.

In other words, the second opening forming portion 412 has a shape in which air in the inner space SP flows out to the outside of the support 401 due to decrease in pressure in the vicinity of the second opening caused by the airflow FL0 blown by rotation of the first rotor blade 402-1, 402-2.

Figure 10:
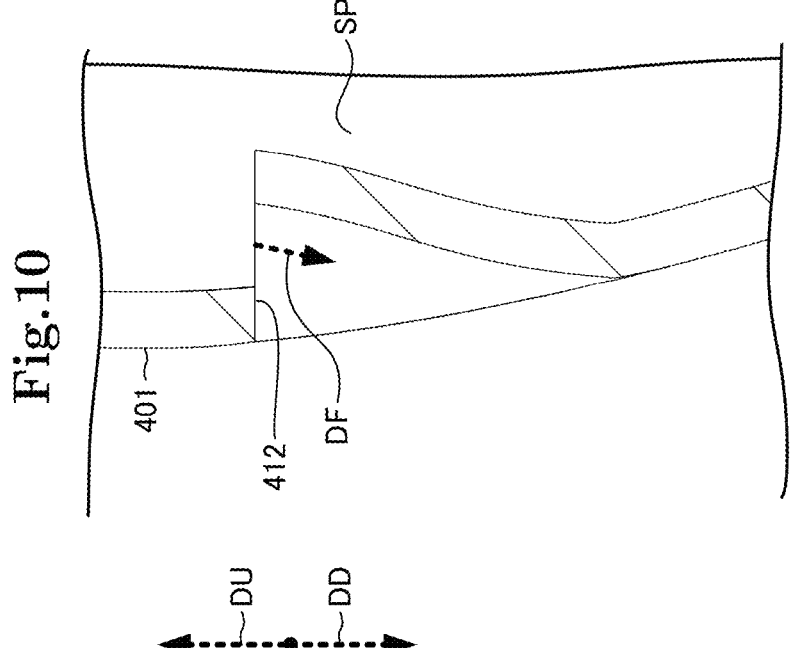
FIG. 10 is a sectional view of an enlarged vicinity of the second opening forming portion in FIG. 8.

In another aspect, as illustrated in FIG. 10, the support 401 is configured that an outflow direction DF does not have a component of the vertically upward direction DU. The outflow direction DF is a direction of an airflow flowing out of the second opening in the center of the second opening if air is flowed in from the first opening when the aircraft 1 and the first rotor blade 402-1, 402-2 are stationary.

Even with this configuration, pressure in the vicinity of the second opening decreases due to the airflow FL0 blown by rotation of the first rotor blade 402-1, 402-2. This causes air inside the inner space SP of the support 401 to flow out to the outside of the support 401, as represented by the arrow FL2.

In this example, the second opening forming portions 412 are located on the outer surface of the support 401 in the left-right direction of the aircraft 1, respectively. Alternatively, the second opening forming portions 412 may be located on the outer surface of the support 401 in either one of the left-right direction of the aircraft 1. In this case, the second opening forming portions 412 may be located on the outer surface, which is closer to the fuselage 10 in the left-right direction of the aircraft 1, of the support 401. Alternatively, the second opening forming portions 412 may be located on the outer surface, which is farther from the fuselage 10 in the left-right direction of the aircraft 1, of the support 401.

In this example, the second opening forming portions 412 are located on the outer surface of the support 401 in the front-back direction of the aircraft 1 with respect to the central axis of rotation of the first rotor blade 402-1, 402-2, respectively. Alternatively, the second opening forming portions 412 may be located on the outer surface of the support 401 in either one of the front-back direction of the aircraft 1 with respect to the central axis of rotation of the first rotor blade 402-1, 402-2. In this case, the second opening forming portions 412 may be located on the outer surface closer to the center of the support 401 in the front-back direction of the aircraft 1, of the support 401 with respect to the central axis of rotation of the first rotor blade 402-1, 402-2. Alternatively, the second opening forming portions 412 may be located on the outer surface farther from the center of the support 401 in the front-back direction of the aircraft 1, of the support 401 with respect to the central axis of rotation of the first rotor blade 402-1, 402-2.

In the support 401, the multiple second opening forming portions 412 may be located adjacent to each other in the front-back direction of the aircraft 1. In the support 401, the multiple second opening forming portions 412 may be located adjacent to each other in the up-down direction of the aircraft 1.

Also, in this example, as illustrated in FIGS. 3 to 5, the positions of the pair of first rotor blades 402-1, 402-2 included in each of the four rotor blade modules 40-1 to 40-4 fixed to the front fixed wing 20-1, and the positions of the pair of first rotor blades 402-1, 402-2 included in each of the four rotor blade modules 40-9 to 40-12 fixed to the rear fixed wing 20-3 are different from each other in the up-down direction of the aircraft 1.

In this example, as illustrated in FIGS. 3 to 5, the pair of first rotor blades 402-1, 402-2 included in each of the four rotor blade modules 40-1 to 40-4 fixed to the front fixed wing 20-1 have a lower position in the up-down direction of the aircraft 1 than the pair of first rotor blades 402-1, 402-2 included in each of the four rotor blade modules 40-9 to 40-12 fixed to the rear fixed wing 20-3. Alternatively, the pair of first rotor blades 402-1, 402-2 included in each of the four rotor blade modules 40-1 to 40-4 fixed to the front fixed wing 20-1 may have a higher position in the up-down direction of the aircraft 1 than the pair of first rotor blades 402-1, 402-2 included in each of the four rotor blade modules 40-9 to 40-12 fixed to the rear fixed wing 20-3.

Figure 2:
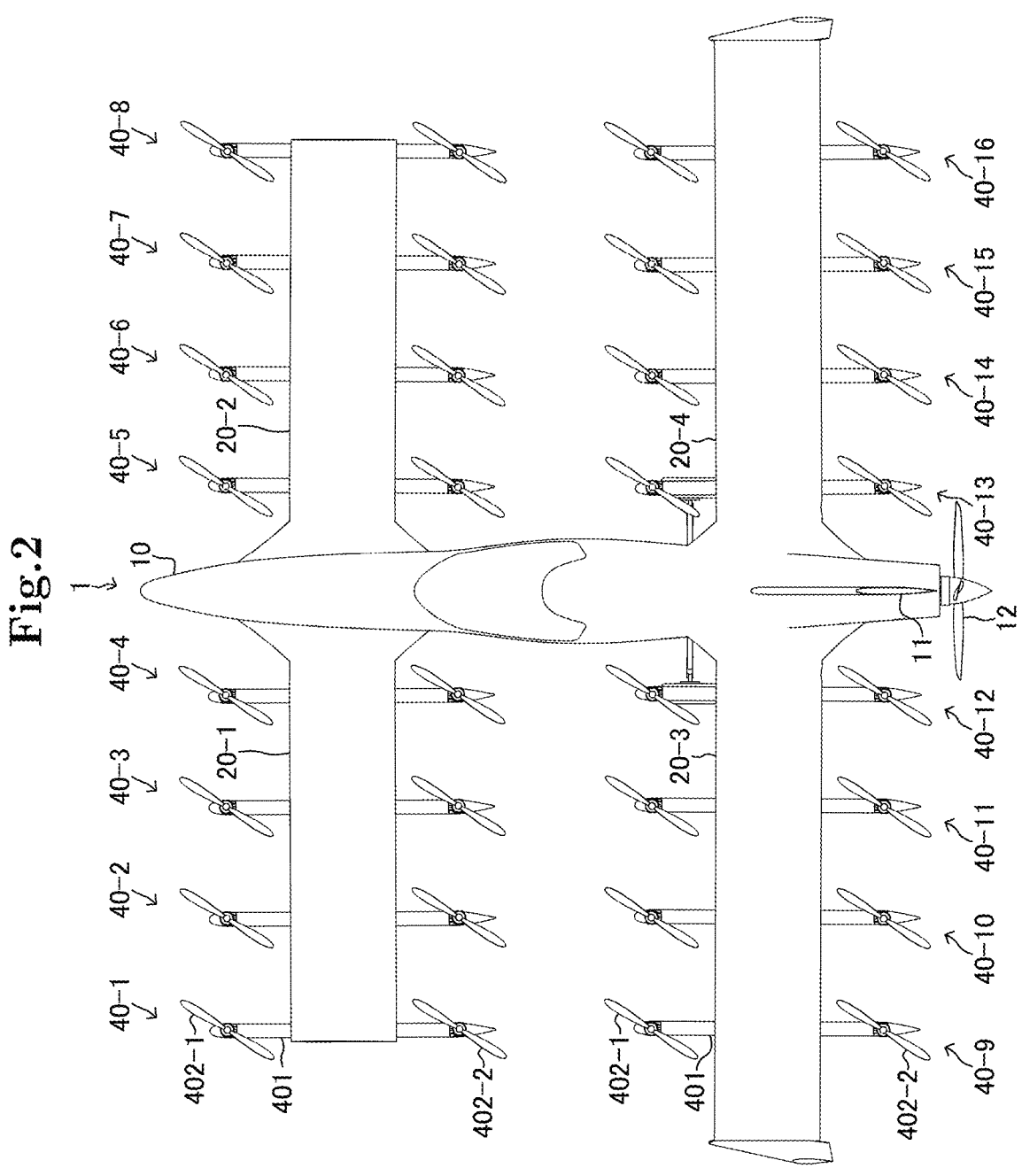
FIG. 2 is a top view illustrating the configuration of the aircraft of the first embodiment.

In this example, as illustrated in FIG. 2, the first rotor blade 402-2 included in each of the four rotor blade modules 40-1 to 40-4 fixed to the front fixed wing 20-1, and the first rotor blade 402-1 included in each of the four rotor blade modules 40-9 to 40-12 fixed to the rear fixed wing 20-3 are separated from each other in the front-back direction of the aircraft 1 when the aircraft 1 is viewed in the vertical direction.

The fuselage 10 has an inner space for accommodating a transported target. In this example, the inner space is located between the pair of front fixed wings 20-1, 20-2 and the pair of rear fixed wings 20-3, 20-4 in the front-back direction of the aircraft 1. For example, the inner space is located at the central portion in the front-back direction of the aircraft 1.

The transported target includes at least one of a person, and an object. For example, the person included in the transported target may be referred to as a passenger. For example, the passenger may pilot the aircraft 1. If the aircraft 1 is configured to fly by autopilot, the passenger may not have to pilot the aircraft 1. For example, the object included in the transported target is a cargo or a baggage.

For example, the inner space of the fuselage 10 may be capable of accommodating one to five passengers. In this example, the inner space of the fuselage 10 can accommodate one or two passengers.

For example, the maximum takeoff weight of the aircraft 1 may be a weight of 120 kg to 3000 kg. In this example, the maximum takeoff weight of the aircraft 1 is a weight of 150 kg to 460 kg. The fuselage 10 includes a door (in this example, a cowl) that can open and close the accommodating space.

The fuselage 10 includes a tail wing 11, a second rotor blade 12, and a control device 13. Alternatively, the number of tail wings included in the fuselage 10 may be two or more.

The tail wing 11 is located at the end portion of the fuselage 10 in the backward direction. The tail wing 11 is a plate-shaped member extending along a plane orthogonal to the left-right direction of the aircraft 1. The tail wing 11 extends from the fuselage 10 in the upward direction of the aircraft 1.

The second rotor blade 12 is rotatably supported by the fuselage 10 such that the central axis of rotation extends in a direction having a main component of the front-back direction of the aircraft 1.

In this example, the aircraft 1 includes a second storage battery, a speed controller, and an electric motor, which are not illustrated. The second rotor blade 12 is rotationally driven by electric power supplied from the second storage battery. Further, the aircraft 1 controls the electric power, which is supplied by the speed controller from the second storage battery to the electric motor, to control the rotation speed of the second rotor blade 12.

In this example, the second storage battery is accommodated in the fuselage 10. The second storage battery may be accommodated in the fixed wing 20-*j* instead of, or in addition to the fuselage 10.

The second rotor blade 12 generates thrust that propels the aircraft 1 forward by being rotationally driven by the electric motor.

With this configuration, the aircraft 1 flies horizontally with the thrust, which is generated by the second rotor blade 12, that propels the aircraft 1 forward, and the lift generated by the pair of front fixed wings 20-1, 20-2 and the pair of rear fixed wings 20-3, 20-4.

In this example, the second rotor blade 12 is located at the end portion of the fuselage 10 in the backward direction. The second rotor blade 12 may be located at a portion other than the end portion of the fuselage 10 in the backward direction (for example, the end portion of the fuselage 10 in the forward direction, or the center portion of the fuselage 10 in the front-back direction, etc.).

Alternatively, the number of second rotor blades 12 included in the fuselage 10 may be two or more. In this case, for example, the second rotor blades 12 may be located at both end portions of the fuselage 10 in the forward and backward directions, or may be located at only one end portion. Alternatively, for example, the second rotor blades 12 may be located on at least one of the pair of front fixed wings 20-1, 20-2 and the pair of rear fixed wings 20-3, 20-4.

In this example, the second rotor blade 12 may also be referred to as a propeller.

In this example, the second rotor blade 12 corresponds to a rotor blade for horizontal direction.

The control device 13 is accommodated in the fuselage 10. The control device 13 controls the aircraft 1 by operating by electric power. The control device 13 includes electronic equipment, which acquires information representing the state of the aircraft 1 (for example, altitude, longitude, latitude, and speed, etc.). In this example, the control device 13 includes avionics (for example, communication equipment, navigation system, or flight management system, etc.).

In this example, the control device 13 generates control signals according to the passenger's operation, and based on the generated control signals, controls the rotation speed of each of the first rotor blades 402-1, 402-2 of the rotor blade modules 40-1 to 40-16 and the second rotor blade 12.

(Operation)

Next, the operation of the aircraft 1 will be described. First, the passenger passes between the front fixed wing 20-1 and the rear fixed wing 20-3 from the left position of the aircraft 1, and boards the inner space of the fuselage 10. Alternatively, the passenger may pass between the front fixed wing 20-2 and the rear fixed wing 20-4 from the right position of the aircraft 1, and board the inner space of the fuselage 10.

Next, the aircraft 1 rotationally drives each of the 16 pairs of first rotor blades 402-1, 402-2, which are included in the 16 rotor blade modules 40-1 to 40-16, respectively. This generates thrust that propels the aircraft 1 upward. As a result, the aircraft 1 takes off by flying vertically upward (in other words, ascending).

In this case, since air is blown by rotation of the first rotor blade 402-1, 402-2, the blown airflow causes air in the inner space SP of the support 401 to flow out of the support 401 through the second opening, which is located downstream of the airflow. This causes air to flow into the inner space SP of the support 401 through the first opening, which is located at a position different from a position downstream of the airflow. As a result, the rotational drive unit (in this example, the electric motor 403-1, the speed controller 404-1, the first storage battery 405-1, the circuit protector 406-1, the circuit switch 407-1, and the controller 408-1), which is located in the inner space SP of the support 401, is cooled by an airflow in the inner space SP.

Then, the aircraft 1 rotationally drives the second rotor blade 12. This generates thrust that propels the aircraft 1 forward. As a result, the pair of front fixed wings 20-1, 20-2 and the pair of rear fixed wings 20-3, 20-4 generate lift. Next, the aircraft 1 stops the rotational drive of each of the 16 pairs of first rotor blades 402-1, 402-2 included in the 16 rotor blade modules 40-1 to 40-16, respectively. As a result, the aircraft 1 flies horizontally (in other words, cruises).

Afterwords, the aircraft 1 rotationally drives each of the 16 pairs of first rotor blades 402-1, 402-2 included in the 16 rotor blade modules 40-1 to 40-16, respectively. This generates thrust that propels the aircraft 1 upward. Next, the aircraft 1 stops the rotational drive of the second rotor blade 12. As a result, the aircraft 1 flies vertically downward (in other words, descends).

In this case, since air is blown by rotation of the first rotor blade 402-1, 402-2, the blown airflow causes air in the inner space SP of the support 401 to flow out of the support 401 through the second opening, which is located downstream of the airflow. This causes air to flow into the inner space SP of the support 401 through the first opening, which is located at a position different from a position downstream of the airflow. As a result, the rotational drive unit, which is located in the inner space SP of the support 401, is cooled by an airflow in the inner space SP.

Then, the aircraft 1 lands.

As described above, the aircraft 1 of the first embodiment performs vertical take-off and landing. The aircraft 1 includes the fuselage 10, the at least one pair of fixed wings 20-1 to 20-4 that extend in the left-right direction from the fuselage 10, the rotor blade 402-1, 402-2 that generates thrust to propel the aircraft 1 vertically upward by being rotationally driven, the rotational drive unit (in this example, the electric motor 403-1, the speed controller 404-1, the first storage battery 405-1, the circuit protector 406-1, the circuit switch 407-1, and the controller 408-1) that rotationally drives the rotor blade 402-1, 402-2 by electric power, and the support 401 that extends in the front-back direction of the aircraft 1, has the inner space SP that accommodates at least a part of the rotational drive unit, and supports the rotor blade 402-1, 402-2.

The support 401 includes the first opening forming portion 411 that has the first opening communicating the inner space SP of the support 401 and the outside of the support 401 at a position different from a position downstream of the airflow FL0 blown by rotation of the rotor blade 402-1, 402-2, and the second opening forming portion 412 that has the second opening communicating the inner space SP of the support 401 and the outside of the support 401 at a position downstream of the airflow FL0 blown by rotation of the rotor blade 402-1, 402-2.

The second opening forming portion 412 has a shape in which air in the inner space SP of the support 401 flows out to the outside of the support 401 due to decrease in pressure in the vicinity of the second opening by the airflow FL0 blown by rotation of the rotor blade 402-1, 402-2.

According to this, when air is blown by rotation of the rotor blade 402-1, 402-2, the blown airflow causes air in the inner space SP to flow out of the support 401 through the second opening, which is located downstream of the airflow FL0. This causes air to flow into the inner space SP through the first opening, which is located at a position different from a position downstream of the airflow FL0. As a result, the rotational drive unit, which is located in the inner space SP, is cooled by an airflow in the inner space SP.

According to the above aircraft 1, in a area downstream of the airflow FL0 blown by rotation of the rotor blade 402-1, 402-2, air does not flow into the inner space SP. Thus, even if air blown by rotation of the rotor blade 402-1, 402-2 contains foreign objects, the foreign objects can be prevented from flowing into the inner space SP. Accordingly, the aircraft 1 can cool the rotational drive unit while suppressing the inflow of foreign objects.

Furthermore, in the aircraft 1 of the first embodiment, the support 401 is configured that an outflow direction DF, which is a direction of an airflow flowing out of the second opening in the center of the second opening if air is flowed in from the first opening when the aircraft 1 and the rotor blade 402-1, 402-2 are stationary, does not have a component of the vertically upward direction DU.

According to this, when an airflow is blown by rotation of the rotor blade 402-1, 402-2, the blown airflow can sufficiently reduce the pressure in the vicinity of the second opening.

Furthermore, in the aircraft 1 of the first embodiment, the second opening forming portion 412 is configured that an opening direction DO, which is a direction orthogonal to a straight line connecting two ends forming the second opening of the outer surface of the support 401 in a cross-section of the support 401 by a vertical plane, the opening direction DO being from the inner space SP to the outside of the support 401, does not have a component of the vertically upward direction DU.

According to this, when an airflow is blown by rotation of the rotor blade 402-1, 402-2, the blown airflow can sufficiently reduce the pressure in the vicinity of the second opening. Furthermore, the inflow of foreign objects to the inner space SP through the second opening can be further suppressed compared to when the opening direction DO has a component of the vertically upward direction DU.

Furthermore, in the aircraft 1 of the first embodiment, the support 401 is located vertically below the fixed wing 20-*j*, and extends from a position before the fixed wing 20-*j* to a position behind the fixed wing 20-*j*. Additionally, the first opening forming portion 411 is located vertically below the fixed wing 20-*j*.

According to this, the first opening is shielded from falling foreign objects by the fixed wing. Therefore, the foreign objects can be prevented from flowing into the inner space SP.

Furthermore, in the aircraft 1 of the first embodiment, the rotational drive unit includes the electric motor 403-1, 403-2 that rotationally drives the rotor blade 402-1, 402-2.

When the rotor blade 402-1, 402-2 is rotationally driven, the electric motor 403-1, 403-2 generates heat. Therefore, according to the aircraft 1, when the rotor blade 402-1, 402-2 is rotationally driven, the temperature of the rotational drive unit can be prevented from becoming excessively high.

Furthermore, in the aircraft 1 of the first embodiment, the rotational drive unit includes the speed controller 404-1, 404-2 that controls the rotation speed of the rotor blade 402-1, 402-2.

When the rotor blade 402-1, 402-2 is rotationally driven, the speed controller 404-1, 404-2 generates heat. Therefore, according to the aircraft 1, when the rotor blade 402-1, 402-2 is rotationally driven, the temperature of the rotational drive unit can be prevented from becoming excessively high.

Additionally, in the aircraft 1 of the first embodiment, the rotational drive unit includes the first storage battery 405-1, 405-2 that supplies electric power to rotationally drive the rotor blade 402-1, 402-2.

When the rotor blade 402-1, 402-2 is rotationally driven, the first storage battery 405-1, 405-2 generates heat. Therefore, according to the aircraft 1, when the rotor blade 402-1, 402-2 is rotationally driven, the temperature of the rotational drive unit can be prevented from becoming excessively high.

Furthermore, in the aircraft 1 of the first embodiment, the second opening forming portion 412 is located on the outer surface of the support 401 in the left-right direction of the aircraft 1.

According to this, since the support 401 extends in the front-back direction of the aircraft 1, the length of the second opening in the front-back direction of the aircraft 1 can be increased. Therefore, the flow rate of air flowing out of the inner space SP of the support 401 can be increased. As a result, the rotational drive unit, which is located in the inner space SP, can be cooled with high efficiency.

Figure 11:
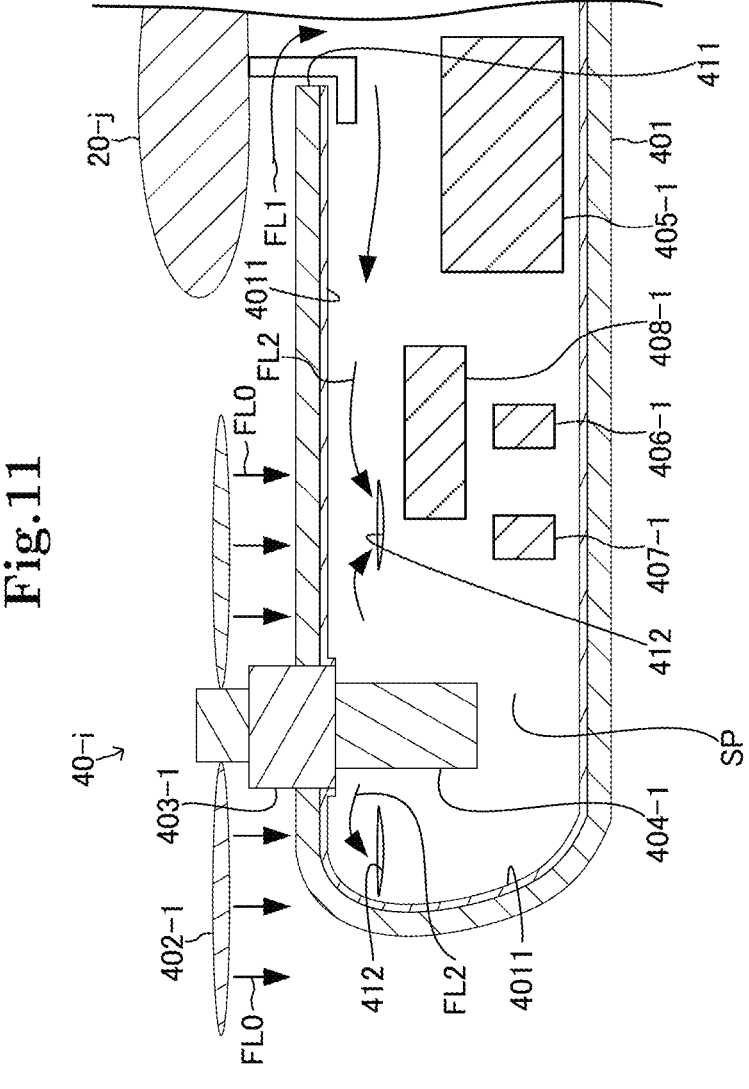
FIG. 11 is a sectional view of a rotor blade module of a modified example of the first embodiment in a vertical plane orthogonal to the left-right direction of the aircraft.

In a modified example of the first embodiment, as illustrated in FIG. 11, the support 401 includes a shielding body 4011 that seals a portion of the inner space SP different from the first opening and the second opening against gas. In other words, the shielding body 4011 covers a portion of the inner wall surface of the support 401 forming the inner space SP other than the first opening and the second opening.

According to this, the flow rate of air entering from the first opening can be increased. Therefore, the rotational drive unit, which is located in the inner space SP of the support 401, can be cooled with high efficiency.

As illustrated in FIG. 12A, the second opening forming portion 412 of the first embodiment is located in an area, where the normal direction in the outer surface of the support 401 has a component of the vertically downward direction, of the outer surface of the support 401. Furthermore, the second opening forming portion 412 has a recessed shape such that, in the edge portion forming the second opening, a vertically downward portion 412D is located more inwardly in the support 401 than a vertically upward portion 412U.

Alternatively, as illustrated in FIG. 12B, the second opening forming portion 412 of a modified example of the first embodiment may be located in an area, where the normal direction in the outer surface of the support 401 has a component of the vertically upward direction, of the outer surface of the support 401. Furthermore, the second opening forming portion 412 may have a recessed shape such that, in the edge portion forming the second opening, a vertically downward portion 412D is located more inwardly in the support 401 than a vertically upward portion 412U.

Alternatively, as illustrated in FIG. 12C, the second opening forming portion 412 of a modified example of the first embodiment may be located in an area, where the normal direction in the outer surface of the support 401 has a component of the vertically downward direction, of the outer surface of the support 401. Furthermore, the second opening forming portion 412 may have a protruding shape such that, in the edge portion forming the second opening, a vertically upward portion 412U is located more outwardly in the support 401 than a vertically downward portion 412D.

Alternatively, as illustrated in FIG. 12D, the second opening forming portion 412 of a modified example of the first embodiment may be located in an area, where the normal direction in the outer surface of the support 401 has a component of the vertically upward direction, of the outer surface of the support 401. Furthermore, the second opening forming portion 412 may have a protruding shape such that, in the edge portion forming the second opening, a vertically upward portion 412U is located more outwardly in the support 401 than a vertically downward portion 412D.

Figure 13E:
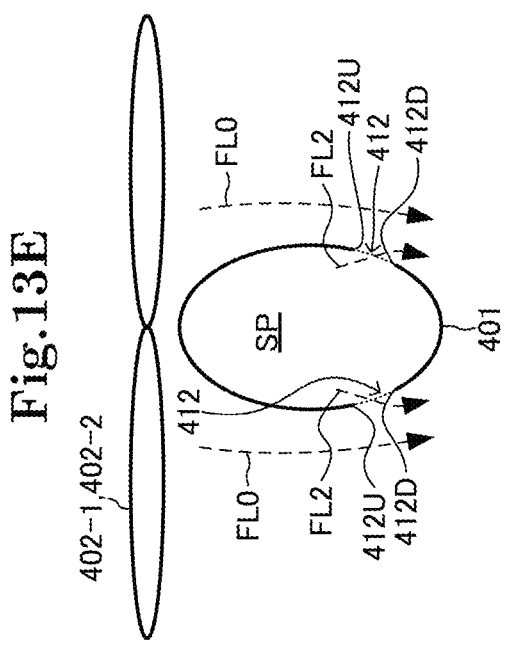
FIG. 13E is a schematic diagram illustrating the second opening forming portion of a modified example of the first embodiment.

Alternatively, as illustrated in FIG. 13E, the second opening forming portion 412 of a modified example of the first embodiment may be located in an area, where the normal direction in the outer surface of the support 401 has a component of the vertically downward direction, of the outer surface of the support 401. Furthermore, the second opening forming portion 412 may have a shape in which, in the edge portion forming the second opening, a vertically upward portion 412U is separated from a vertically downward portion 412D along the outer surface of the support 401.

Figure 14:
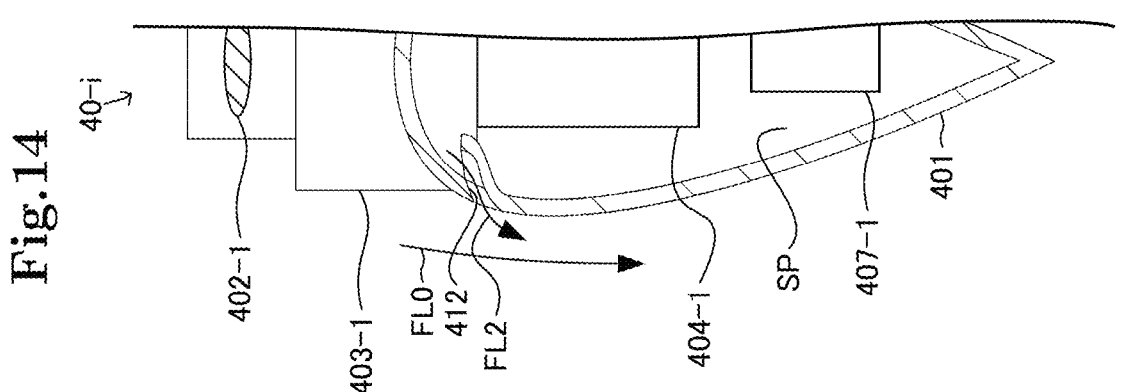
FIG. 14 is a sectional view of the rotor blade module of a modified example of the first embodiment in a vertical plane orthogonal to the front-back direction of the aircraft.
Figure 15:
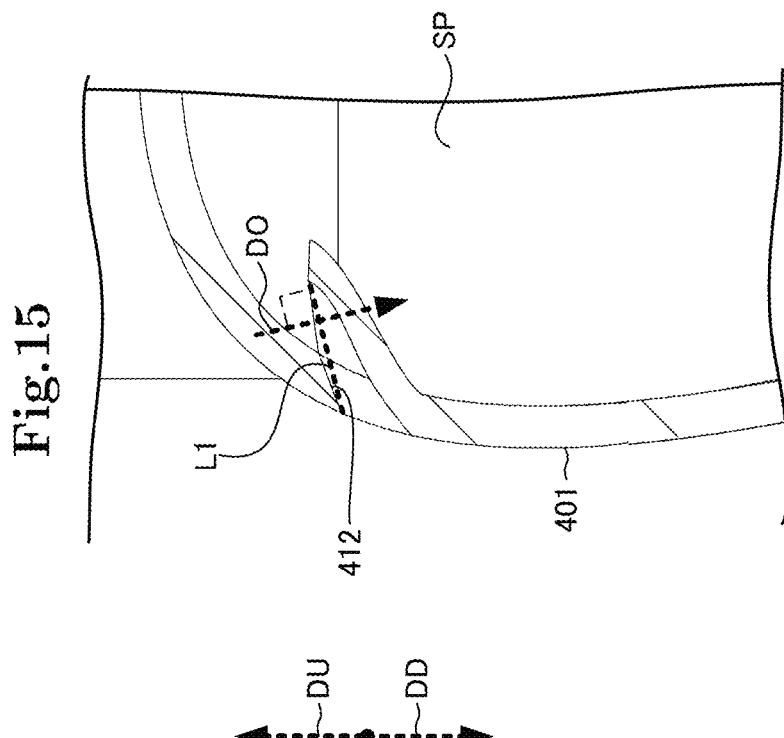
FIG. 15 is a sectional view of an enlarged vicinity of the second opening forming portion in FIG. 14.

Here, a specific example of the modified example of the first embodiment illustrated in FIG. 12B will be described. As illustrated in FIG. 14 illustrating a cross-section of the rotor blade module 40-$i$ by a vertical plane, and FIG. 15 illustrating an enlarged view of the second opening forming portion 412 in FIG. 14, the second opening forming portion 412 is configured that an opening direction DO does not have a component of the vertically upward direction DU. The opening direction DO is a direction orthogonal to a straight line L1 connecting two ends forming the second opening of the outer surface of the support 401 in a cross-section of the support 401 by a vertical plane. Furthermore, the opening direction DO is from the inner space SP of the support 401 to the outside of the support 401.

Figure 16:
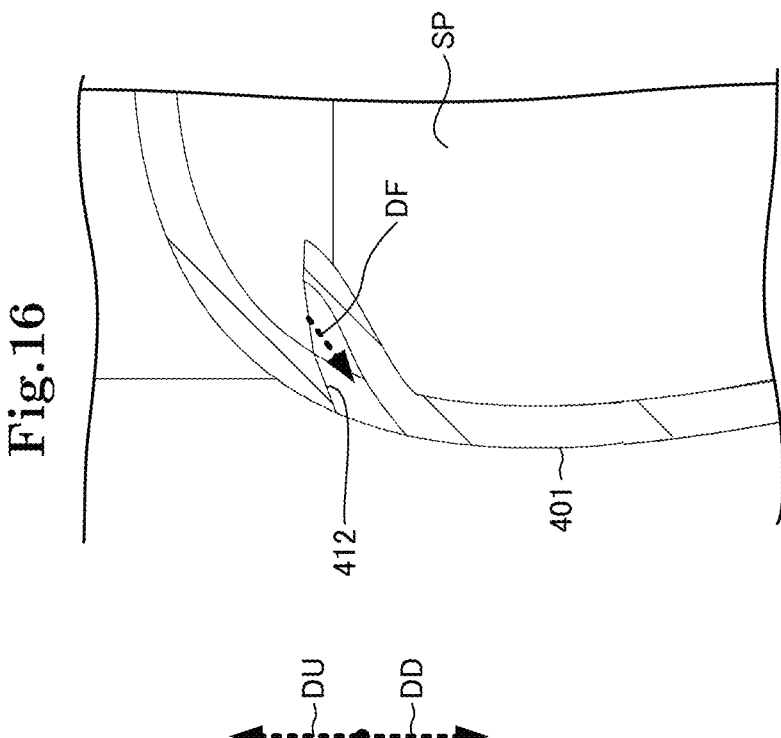
FIG. 16 is a sectional view of an enlarged vicinity of the second opening forming portion in FIG. 14.

In another aspect, as illustrated in FIG. 16, the support 401 is configured that an outflow direction DF does not have a component of the vertically upward direction DU. The outflow direction DF is a direction of an airflow flowing out of the second opening in the center of the second opening if air is flowed in from the first opening when the aircraft 1 and the first rotor blade 402-1, 402-2 are stationary.

Figure 17:
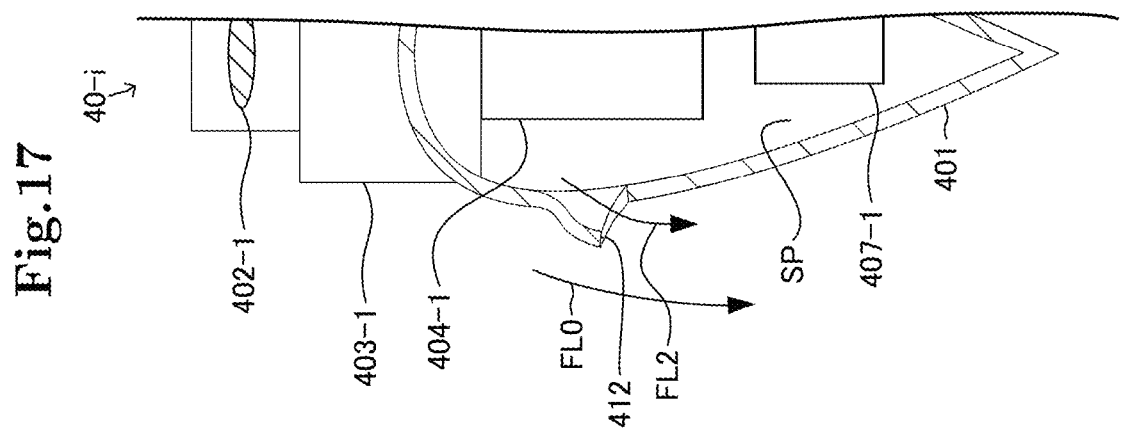
FIG. 17 is a sectional view of the rotor blade module of a modified example of the first embodiment in a vertical plane orthogonal to the front-back direction of the aircraft.
Figure 18:
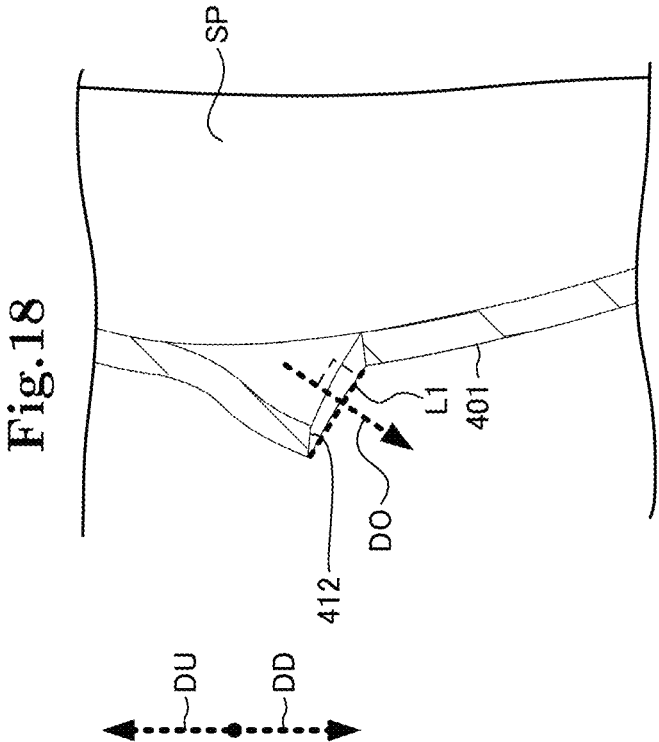
FIG. 18 is a sectional view of an enlarged vicinity of the second opening forming portion in FIG. 17.

Next, a specific example of the modified example of the first embodiment illustrated in FIG. 12C will be described. As illustrated in FIG. 17 illustrating a cross-section of the rotor blade module 40-$i$ by a vertical plane, and FIG. 18 illustrating an enlarged view of the second opening forming portion 412 in FIG. 17, the second opening forming portion 412 is configured that an opening direction DO does not have a component of the vertically upward direction DU. The opening direction DO is a direction orthogonal to a straight line L1 connecting two ends forming the second opening of the outer surface of the support 401 in a cross-section of the support 401 by a vertical plane. Furthermore, the opening direction DO is from the inner space SP of the support 401 to the outside of the support 401.

Figure 19:
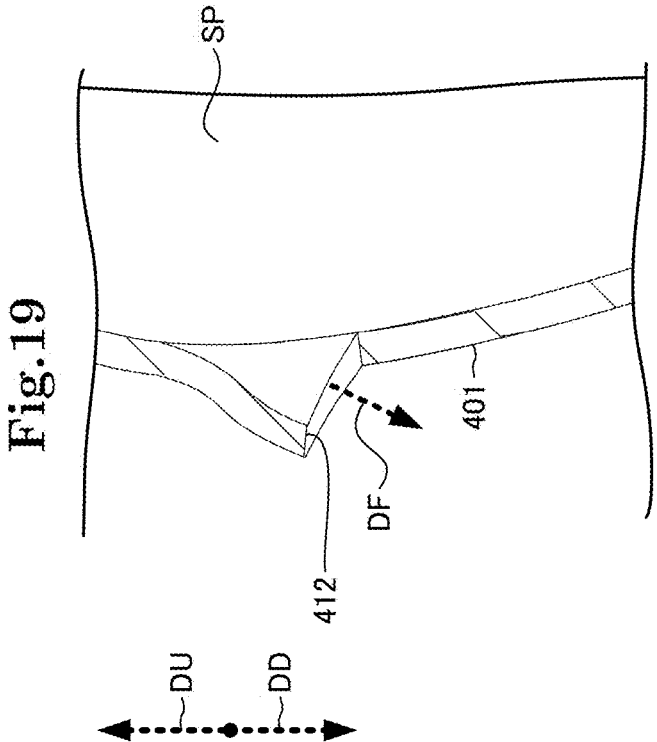
FIG. 19 is a sectional view of an enlarged vicinity of the second opening forming portion in FIG. 17.

In another aspect, as illustrated in FIG. 19, the support 401 is configured that an outflow direction DF does not have a component of the vertically upward direction DU. The outflow direction DF is a direction of an airflow flowing out of the second opening in the center of the second opening if air is flowed in from the first opening when the aircraft 1 and the first rotor blade 402-1, 402-2 are stationary.

Figure 20:
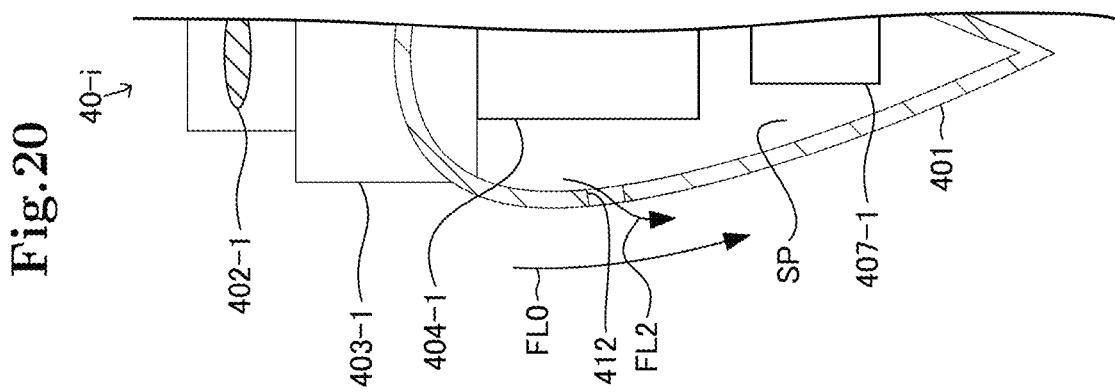
FIG. 20 is a sectional view of the rotor blade module in a modified example of the first embodiment in a vertical plane orthogonal to the front-back direction of the aircraft.

Next, a specific example of the modified example of the first embodiment illustrated in FIG. 13E will be described. As illustrated in FIG. 20 illustrating a cross-section of the rotor blade module 40-$i$ by a vertical plane, and FIG. 21 illustrating an enlarged view of the second opening forming portion 412 in FIG. 20, the second opening forming portion 412 is configured that an opening direction DO does not have a component of the vertically upward direction DU. The opening direction DO is a direction orthogonal to a straight line L1 connecting two ends forming the second opening of the outer surface of the support 401 in a cross-section of the support 401 by a vertical plane. Furthermore, the opening direction DO is from the inner space SP of the support 401 to the outside of the support 401.

Figure 22:
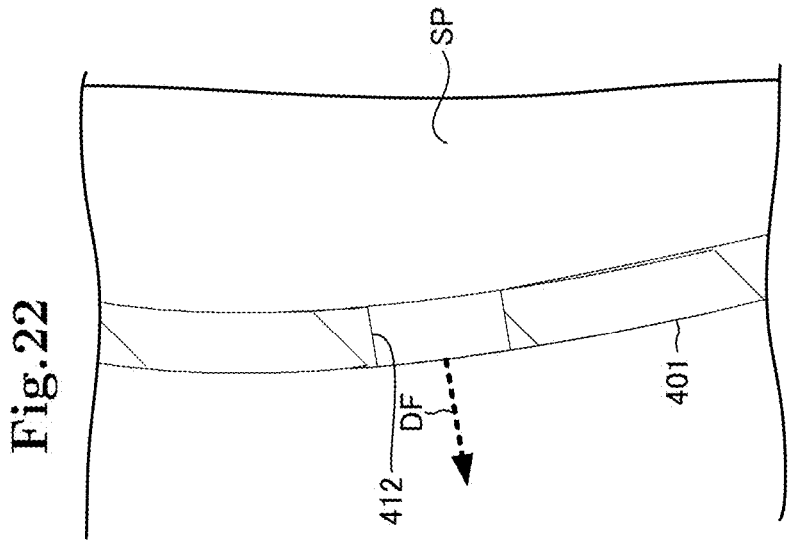
FIG. 22 is a sectional view of an enlarged vicinity of the second opening forming portion in FIG. 20.

In another aspect, as illustrated in FIG. 22, the support 401 is configured that an outflow direction DF does not have a component of the vertically upward direction DU. The outflow direction DF is a direction of an airflow flowing out of the second opening in the center of the second opening if air is flowed in from the first opening when the aircraft 1 and the first rotor blade 402-1, 402-2 are stationary.

This disclosure is not limited to the embodiments described above. For example, various modifications that can be understood by those skilled in the art may be made to the embodiment described above within the scope without departing from the spirit of the present disclosure.

What is claimed is:

1. An aircraft that performs vertical take-off and landing, the aircraft comprising:
   a fuselage;
   at least one pair of fixed wings that extends in a left-right direction from the fuselage;
   a rotor blade configured to generate thrust to propel the aircraft vertically upward by being rotationally driven;
   a rotational drive unit configured to rotationally drive the rotor blade by electric power; and
   a support that extends in a front-back direction of the aircraft, has an inner space that accommodates at least a part of the rotational drive unit, and supports the rotor blade, wherein
   the rotor blade is rotatably supported by the support vertically above the support,
   the support has a first opening forming portion that has a first opening communicating the inner space and an outside of the support at a position different from a position downstream of an airflow blown by rotation of the rotor blade, and a second opening forming portion that has a second opening communicating the inner space and the outside of the support at a position downstream of the airflow blown by rotation of the rotor blade in such a manner that air in the inner space flows out to the outside of the support due to decrease in pressure in the vicinity of the second opening by the airflow blown by rotation of the rotor blade, the support is located vertically below the fixed wing, and extends from a position in front of the fixed wing to a position behind the fixed wing, and the first opening forming portion is located at an end face of the support in vertically upward direction.

2. The aircraft according to claim 1, wherein the support is configured that an outflow direction, which is a direction of an airflow flowing out of the second opening in a center of the second opening does not have a component of the vertically upward direction.

3. The aircraft according to claim 1, wherein the second opening forming portion is configured that an opening direction, which is a direction orthogonal to a straight line connecting two ends forming the second opening of the outer surface of the support in a cross-section of the support by a vertical plane, the opening direction being from the inner space to the outside of the support, does not have a component of the vertically upward direction.

4. The aircraft according to claim 1, wherein the rotational drive unit includes an electric motor configured to rotationally drive the rotor blade.

5. The aircraft according to claim 1, wherein the rotational drive unit includes a speed controller configured to control the rotation speed of the rotor blade.

6. The aircraft according to claim 1, wherein the rotational drive unit includes a storage battery configured to supply electric power to rotationally drive the rotor blade.

7. The aircraft according to claim 1, wherein the second opening forming portion is located on the outer surface of the support in the left-right direction.

8. The aircraft according to claim 1, wherein the support includes a shielding body that covers a portion of an inner wall surface of the support forming the inner space other than the first opening and the second opening in an airtight manner.

9. The aircraft according to claim 1, wherein the second opening is located downstream of the rotor blade.

10. The aircraft according to claim 1, wherein an opening direction of the second opening is a direction orthogonal to a straight line connecting two ends forming the second opening of an outer surface of the support in a cross-section of the support by a vertical plane; and the opening direction does not have a component of a vertical upward direction.

11. The aircraft according to claim 1, wherein an opening direction of the second opening is a direction orthogonal to a straight line connecting two ends forming the second opening of an outer surface of the support in a cross-section of the support by a vertical plane; and the opening direction is orthogonal to the vertical direction.

12. The aircraft according to claim 1, wherein an opening direction of the second opening is a direction orthogonal to a straight line connecting two ends forming the second opening of an outer surface of the support in a cross-section of the support by a vertical plane; and the opening direction has a component of the vertically downward direction.

13. The aircraft according to claim 1, wherein the first opening is located underneath the at least one of the fixed wings.

14. The aircraft according to claim 1, wherein the second opening forming portion is located in an area, where a normal direction in the outer surface of the support has a component of a vertically downward direction, of the outer surface of the support, and the second opening forming portion includes a recessed shape such that, in an edge portion forming the second opening, a vertically downward portion is located more inwardly in the support than a vertically upward portion.

15. The aircraft according to claim 1, wherein the second opening forming portion is located in an area, where a normal direction in the outer surface of the support has a component of a vertically upward direction, of the outer surface of the support, and the second opening forming portion includes a recessed shape such that, in an edge portion forming the second opening, a vertically downward portion is located more inwardly in the support than a vertically upward portion.

16. The aircraft according to claim 1, wherein the second opening forming portion is located in an area, where a normal direction in the outer surface of the support has a component of a vertically downward direction, of the outer surface of the support, and the second opening forming portion includes a protruding shape such that, in an edge portion forming the second opening, a vertically upward portion is located more outwardly in the support than a vertically downward portion.

17. The aircraft according to claim 1, wherein the second opening forming portion is located in an area, where a normal direction in the outer surface of the support has a component of a vertically upward direction, of the outer surface of the support, and the second opening forming portion includes a protruding shape such that, in an edge portion forming the second opening, a vertically upward portion is located more outwardly in the support than a vertically downward portion.

18. The aircraft according to claim 1, wherein the second opening forming portion is located in an area, where a normal direction in the outer surface of the support has a component of a vertically downward direction, of the outer surface of the support, and the second opening forming portion includes a shape in which, in an edge portion forming the second opening, a vertically upward portion is separated from a vertically downward portion along the outer surface of the support.

19. A rotor blade module fixed to a fixed wing extending in a left-right direction from a fuselage of an aircraft, the rotor blade module comprising:

a rotor blade configured to generate thrust to propel the aircraft vertically upward by being rotationally driven;

a rotational drive unit configured to rotationally drive the rotor blade by electric power; and a support that extends in a front-back direction of the aircraft, has an inner space that accommodates at least a part of the rotational drive unit, and supports the rotor blade, wherein the rotor blade is rotatably supported by the support vertically above the support, the support has a first opening forming portion that has a first opening communicating the inner space and an outside of the support at a position different from a position downstream of an airflow blown by rotation of the rotor blade, and a second opening forming portion that has a second opening communicating the inner space and the outside of the support at a position downstream of the airflow blown by rotation of the rotor blade in such a manner that air in the inner space flows out to the outside of the support due to decrease in pressure in the vicinity of the second opening by the airflow blown by rotation of the rotor blade, the support is located vertically below the fixed wing, and extends from a position in front of the fixed wing to a position behind the fixed wing, and the first opening forming portion is located at an end face of the support in vertically upward direction.

20. The rotor blade module according to claim 19, wherein the second opening is located downstream of the rotor blade.

\* \* \* \* \*